(12) United States Patent
Tso et al.

(10) Patent No.: US 12,257,736 B2
(45) Date of Patent: Mar. 25, 2025

(54) THERMOCHROMIC COMPOSITE MATERIAL, ITS PREPARATION AND USE

(71) Applicant: City University of Hong Kong, Kowloon (HK)

(72) Inventors: Chi Yan Tso, Kowloon (HK); Sai Liu, Kowloon (HK); Hau Him Lee, Kowloon (HK); Tsz Chung Ho, Kowloon (HK)

(73) Assignee: City University of Hong Kong, Kowloon (HK)

( * ) Notice: Subject to any disclaimer, the term of this patent is extended or adjusted under 35 U.S.C. 154(b) by 352 days.

(21) Appl. No.: 17/589,928

(22) Filed: Feb. 1, 2022

(65) Prior Publication Data

US 2022/0242004 A1  Aug. 4, 2022

Related U.S. Application Data

(60) Provisional application No. 63/144,497, filed on Feb. 2, 2021.

(51) Int. Cl.
| | | |
|---|---|---|
| *B27K 3/15* | (2006.01) | |
| *B27K 3/08* | (2006.01) | |
| *C08L 97/02* | (2006.01) | |
| *C08L 101/14* | (2006.01) | |

(52) U.S. Cl.
CPC ............ *B27K 3/153* (2013.01); *B27K 3/08* (2013.01); *C08L 97/02* (2013.01); *C08L 101/14* (2013.01)

(58) Field of Classification Search
CPC ............................. C08L 101/14; C08L 97/02
See application file for complete search history.

(56) References Cited

PUBLICATIONS

Montanari et al. (ACS Applied Materials and Interfaces 2019, 11, 20465-20472) (Year: 2019).*
Wu et al. (ACS Applied Materials and Interfaces 2018, 10, 39819-39827) (Year: 2018).*
Gholamzadehmir M, Del Pero C, Buffa S, Fedrizzi R, Aste N. Adaptive-predictive control strategy for HVAC systems in smart buildings—A review. Sustain Cities Soc 2020;63:102480. https://doi.org/10.1016/j.scs.2020.102480.
Catrini P, Curto D, Franzitta V, Cardona F. Improving energy efficiency of commercial buildings by Combined Heat Cooling and Power plants. Sustain Cities Soc 2020;60:102157. https://doi.org/10.1016/j.scs.2020.102157.
Wang S, Owusu KA, Mai L, Ke Y, Zhou Y, Hu P, et al. Vanadium dioxide for energy conservation and energy storage applications: Synthesis and performance improvement. Appl Energy 2018;211:200-17. https://doi.org/10.1016/j.apenergy.2017.11.039.
Kahsay MT, Bitsuamlak GT, Tariku F. Thermal zoning and window optimization framework for high-rise buildings. Appl Energy 2021;292:116894. https://doi.org/10.1016/j.apenergy.2021.116894.
Jiang T, Zhao X, Yin X, Yang R, Tan G. Dynamically adaptive window design with thermo-responsive hydrogel for energy efficiency. Appl Energy 2021;287:116573. https://doi.org/10.1016/j.apenergy.2021.116573.
Sun Y, Wu Y, Wilson R. A review of thermal and optical characterisation of complex window systems and their building performance prediction. Appl Energy 2018;222:729-47. https://doi.org/10.1016/j.apenergy.2018.03.144.
Ke Y, Chen J, Lin G, Wang S, Zhou Y, Yin J, et al. Smart Windows: Electro-, Thermo-, Mechano-, Photochromics, and Beyond. Adv Energy Mater 2019;9:1902066. https://doi.org/10.1002/aenm.201902066.
Aburas M, Soebarto V, Williamson T, Liang R, Ebendorff-Heidepriem H, Wu Y. Thermochromic smart window technologies for building application: A review. Appl Energy 2019;255:113522. https://doi.org/10.1016/j.apenergy.2019.113522.
Ku F, Cao X, Luo H, Jin P. Recent advances in VO2-based thermochromic composites for smart windows. J Mater Chem C 2018;6:1903-19. https://doi.org/10.1039/c7tc05768g.
Warwick MEA, Binions R. Advances in thermochromic vanadium dioxide films. J Mater Chem A 2014;2:3275-92. https://doi.org/10.1039/c3ta14124a.
Liu S, Du YW, Tso CY, Lee HH, Cheng R, Feng SP, et al. Organic Hybrid Perovskite (MAPbI3-xClx) for Thermochromic Smart Window with Strong Optical Regulation Ability, Low Transition Temperature, and Narrow Hysteresis Width. Adv Funct Mater 2021;2010426:1-12. https://doi.org/10.1002/adfm.202010426.
Zhang Y, Tso CY, Iñigo JS, Liu S, Miyazaki H, Chao CYH, et al. Perovskite thermochromic smart window: Advanced optical properties and low transition temperature. Appl Energy n.d. https://doi.org/10.1016/j.apenergy.2019.113690.
Zhu J, Huang A, Ma H, Ma Y, Tong K, Ji S, et al. Composite Film of Vanadium Dioxide Nanoparticles and Ionic Liquid-Nickel-Chlorine Complexes with Excellent Visible Thermochromic Performance. ACS Appl Mater Interfaces 2016;8:29742-8. https://doi.org/10.1021/acsami.6b11202.
Chen Y, Zhu J, Ma H, Chen L, Li R, Jin P. VO 2 /Nickel-bromine-ionic liquid composite film for thermochromic application. Sol Energy Mater Sol Cells 2019;196:124-30. https://doi.org/10.1016/j.solmat.2019.03.047.

(Continued)

*Primary Examiner* — Liam J Heincer
(74) *Attorney, Agent, or Firm* — Renner, Kenner, Greive, Bobak, Taylor & Weber

(57) ABSTRACT

A composite material comprising a substrate body having a mesoporous structure defined by a network of interconnected fibers; and a thermochromic material including a hydrogel complex filling the mesoporous network, the hydrogel complex including a first polymer being a thermo-responsive hydrogel; wherein the thermochromic material undergoes an increase or a decrease of transparency in response to an external temperature exceeding or falling below a critical transition temperature of the thermochromic material, thereby changing an overall transparency of the composite material. A method of preparing the composite material of some embodiments of the present invention. Use of the composite material of some of the embodiments of the present invention for forming an article. Also a window unit including the composite material of some of the embodiments of the present invention.

16 Claims, 18 Drawing Sheets

(56) References Cited

PUBLICATIONS

Li XH, Liu C, Feng SP, Fang NX. Broadband Light Management with Thermochromic Hydrogel Microparticles for Smart Windows. Joule 2019;3:290-302. https://doi.org/10.1016/j.joule.2018.10.019.

Zhou Y, Dong X, Mi Y, Fan F, Xu Q, Zhao H, et al. Hydrogel smart windows. J Mater Chem A 2020;8:10007-25. https://doi.org/10.1039/d0ta00849d.

Kong M, Egbo K, Liu CP, Hossain MK, Tso CY, Hang Chao CY, et al. Rapid thermal annealing assisted facile solution method for tungsten-doped vanadium dioxide thin films on glass substrate. J Alloys Compd 2020;833:155053. https://doi.org/10.1016/j.jallcom.2020.155053.

Zhou Y, Wang S, Peng J, Tan Y, Li C, Boey FYC, et al. Liquid Thermo-Responsive Smart Window Derived from Hydrogel. Joule 2020;4:2458-74. https://doi.org/10.1016/j.joule.2020.09.001.

Zhou Y, Cai Y, Hu X, Long Y. VO2/hydrogel hybrid nanothermochromic material with ultra-high solar modulation and uminous transmission. J Mater Chem A 2015;3:1121-6. https://doi.org/10.1039/c4ta05035e.

Haq MA, Su Y, Wang D. Mechanical properties of PNIPAM based hydrogels: A review. Mater Sci Eng C 2017;70:842-55. https://doi.org/10.1016/j.msec.2016.09.081.

Zhu J, Wang X, He C, Wang H. Mechanical properties, anisotropic swelling behaviours and structures of jellyfish mesogloea. J Mech Behav Biomed Mater 2012;6:63-73. https://doi.org/10.1016/j.jmbbm.2011.10.005.

Wang X, Wang H, Brown HR. Jellyfish gel and its hybrid hydrogels with high mechanical strength. Soft Matter 2011;7:211-9. https://doi.org/10.1039/c0sm00632g.

Peng X, He C, Liu J, Wang H. Biomimetic jellyfish-like PVA/graphene oxide nanocomposite hydrogels with anisotropic and pH-responsive mechanical properties. J Mater Sci 2016;51:5901-11. https://doi.org/10.1007/s10853-016-9891-x.

Chen C, Kuang Y, Zhu S, Burgert I, Keplinger T, Gong A, et al. Structure-property-function relationships of natural and engineered wood. Nat Rev Mater 2020;5:642-66. https://doi.org/10.1038/s41578-020-0195-z.

Mi R, Chen C, Keplinger T, Pei Y, He S, Liu D, et al. Scalable aesthetic transparent wood for energy efficient buildings. Nat Commun 2020;11:1-9. https://doi.org/10.1038/s41467-020-17513-w.

Jia C, Chen C, Mi R, Li T, Dai J, Yang Z, et al. Clear Wood toward High-Performance Building Materials. ACS Nano 2019;13:9993-10001. https://doi.org/10.1021/acsnano.9b00089.

Mi R, Li T, Dalgo D, Chen C, Kuang Y, He S, et al. A Clear, Strong, and Thermally Insulated Transparent Wood for Energy Efficient Windows. Adv Funct Mater 2020;30:1907511. https://doi.org/10.1002/adfm.201907511.

Zhu M, Song J, Li T, Gong A, Wang Y, Dai J, et al. Highly Anisotropic, Highly Transparent Wood Composites. Adv Mater 2016;28:5181-7. https://doi.org/10.1002/adma.201600427.

Li Y, Fu Q, Yu S, Yan M, Berglund L. Optically Transparent Wood from a Nanoporous Cellulosic Template: Combining Functional and Structural Performance. Biomacromolecules 2016;17:1358-64. https://doi.org/10.1021/acs.biomac.6b00145.

Zhu M, Li T, Davis CS, Yao Y, Dai J, Wang Y, et al. Transparent and haze wood composites for highly efficient broadband light management in solar cells. Nano Energy 2016;26:332-9. https://doi.org/10.1016/j.nanoen.2016.05.020.

Fu Q, Chen Y, Sorieul M. Wood-Based Flexible Electronics. ACS Nano 2020;14:3528-38. https://doi.org/10.1021/acsnano.9b09817.

Liu Z. National carbon emissions from the industry process: Production of glass, soda ash, ammonia, calcium carbide and alumina. Appl Energy 2016;166:239-44. https://doi.org/10.1016/j.apenergy.2015.11.005.

Montanari C, Li Y, Chen H, Yan M, Berglund LA. Transparent Wood for Thermal Energy Storage and Reversible Optical Transmittance. ACS Appl Mater Interfaces 2019;11:20465-72. https://doi.org/10.1021/acsami.9b05525.

Acciaro R, Gilanyi T, Varga I. Preparation of monodisperse poly(N-isopropylacrylamide) microgel particles with homogenous cross-link density distribution. Langmuir 2011;27:7917-25. https://doi.org/10.1021/la2010387.

Liu S, Tso CY, Lee HH, Zhang Y, Yu KM, Chao CYH. Bio-inspired TiO2 nano-cone antireflection layer for the optical performance improvement of VO2 thermochromic smart windows. Sci Rep 2020;10:1-14. https://doi.org/10.1038/s41598-020-68411-6.

Nemeth I. ASTM Committee D-30 on Composite Materials. Standard test method for tensile properties of polymer matrix composite materials, 2008.

Franco A. An apparatus for the routine measurement of thermal conductivity of materials for building application based on a transient hot-wire method. Appl Therm Eng 2007;27:2495-504. https://doi.org/10.1016/j.applthermaleng.2007.02.008.

Borrega M, Ahvenainen P, Serimaa R, Gibson L. Composition and structure of balsa (*Ochroma pyramidale*) wood. Wood Sci Technol 2015;49:403-20. https://doi.org/10.1007/s00226-015-0700-5.

Kong W, Wang C, Jia C, Kuang Y, Pastel G, Chen C, et al. Muscle-Inspired Highly Anisotropic, Strong, Ion-Conductive Hydrogels. Adv Mater 2018;30:1-7. https://doi.org/10.1002/adma.201801934.

Kumar P, Choonara YE, du Toit LC, Modi G, Naidoo D, Pillay V. Novel high-viscosity polyacrylamidated chitosan for neural tissue engineering: Fabrication of anisotropic neurodurable scaffold via molecular disposition of persulfate-mediated polymer slicing and complexation. Int J Mol Sci 2012;13:13966-84. https://doi.org/10.3390/ijms131113966.

Wu M, Shi Y, Li R, Wang P. Spectrally Selective Smart Window with High Near-Infrared Light Shielding and Controllable Visible Light Transmittance. ACS Appl Mater Interfaces 2018;10:39819-27. https://doi.org/10.1021/acsami.8b15574.

Li X, Zhang S, Yang L, Li X, Chen J, Huang C. A convenient way to reduce the hysteresis width of VO2(M) nanomaterials. New J Chem 2017;41:15260-7. https://doi.org/10.1039/c7nj02632c.

Djonlagić J, Petrović ZS. Semi-interpenetrating polymer networks composed of poly(N-isopropyl acrylamide) and polyacrylamide hydrogels. J Polym Sci Part B Polym Phys 2004;42:3987-99. https://doi.org/10.1002/polb.20247.

Long L, Ye H. How to be smart and energy efficient: A general discussion on thermochromic windows. Sci Rep 2014;4:1-10. https://doi.org/10.1038/srep06427.

Warwick MEA, Ridley I, Binions R. The effect of transition gradient in thermochromic glazing systems. Energy Build 2014;77:80-90. https://doi.org/10.1016/j.enbuild.2014.03.044.

Gotoh T, Nakatani Y, Sakohara S. Novel synthesis of thermosensitive porous hydrogels. J Appl Polym Sci 1998;69:895-906. https://doi.org/10.1002/(SICI)1097-4628(19980801)69:5<895::AID-APP8>3.0.CO;2-H.

Liu J, Fan X, Tao Y, Deng C, Yu K, Zhang W, et al. Two-Step Freezing Polymerization Method for Efficient Synthesis of High-Performance Stimuli-Responsive Hydrogels. ACS Omega 2020;5:5921-30. https://doi.org/10.1021/acsomega.9b04224.

Reiterer A, Lichtenegger H, Tschegg S, Fratzl P. Experimental evidence for a mechanical function of the cellulose microfibril angle in wood cell walls. Philos Mag A 1999;79:2173-84. https://doi.org/10.1080/01418619908210415.

DOE. New Construction—Commercial Reference Buildings. Http://EnergyGov/Eere/Buildings/Commercial-Reference-Buildings 2015:accessed May 5, 2015. http://energy.gov/eere/buildings/new-construction-commercial-reference-buildings.

Giustino F, Snaith HJ. Toward Lead-Free Perovskite Solar Cells. ACS Energy Lett 2016;1:1233-40. https://doi.org/10.1021/acsenergylett.6b00499.

Cui Y, Ke Y, Liu C, Chen Z, Wang N, Zhang L, et al. Thermochromic VO2 for Energy-Efficient Smart Windows. Joule 2018;2:1707-46. https://doi.org/10.1016/j.joule.2018.06.018.

Zhou Y, Cai Y, Hu X, Long Y. Temperature-responsive hydrogel with ultra-large solar modulation and high luminous transmission for "smart window" applications. J Mater Chem A 2014;2:13550-5. https://doi.org/10.1039/c4ta02287d.

Yu Z, Yao Y, Yao J, Zhang L, Chen Z, Gao Y, et al. Transparent wood containing CsXWO3 nanoparticles for heat-shielding window applications. J Mater Chem A 2017;5:6019-24. https://doi.org/10.1039/c7ta00261k.

(56) References Cited

PUBLICATIONS

Qiu Z, Xiao Z, Gao L, Li J, Wang H, Wang Y, et al. Transparent wood bearing a shielding effect to infrared heat and ultraviolet via incorporation of modified antimony-doped tin oxide nanoparticles. Compos Sci Technol 2019;172:43-8. htttps://doi.org/10.1016/j.compscitech.2019.01.005.

Zhang L, Wang A, Zhu T, Chen Z, Wu Y, Gao Y. Transparent Wood Composites Fabricated by Impregnation of Epoxy Resin and W-Doped VO2Nanoparticles for Application in Energy-Saving Windows. ACS Appl Mater Interfaces 2020;12:34777-83. https://doi.org/10.1021/acsami.0c06494.

\* cited by examiner

Comparison of optical and transition properties among this study, previously various thermochromic smart windows and energy-efficient transparent woods

| Categories | Materials | Thermochromism | Optical Properties | | | | Transition Properties | | | | | | Refs. |
|---|---|---|---|---|---|---|---|---|---|---|---|---|---|
| | | | $T_{lum,hot}$ (%) | $T_{lum,cold}$ (%) | $T_{lum,ave}$ (%) | $\Delta T_{sol}$ (%) | $T_{c,h}$ (°C) | $T_{c,c}$ (°C) | $T_c$ (°C) | $\Delta T_c$ (°C) | $t_{c,h}(s)$ | $t_{c,c}(s)$ | |
| Thermochromic smart windows | Ionic liquid | Yes | 43.9 | 66.4 | 55.2 | 26.5 | - | - | 80.0 | - | - | - | [1] |
| | Perovskite (CH$_3$NH$_3$PbCl$_x$I$_{3-x}$) | Yes | 30.3 | 85.2 | 57.8 | 23.7 | 44.9 | 35.3 | 40.1 | 9.6 | 60 | 120 | [2] |
| | Hydrogel (PNIPAM) | Yes | 59.9 | 87.9 | 73.9 | 20.4 | - | - | 32.0 | - | - | - | [3] |
| | VO$_2$ | Yes | 61.2 | 68.2 | 64.7 | 9.8 | 55.5 | 43.2 | 30.5 | 12.3 | - | - | [4] |
| Energy-efficient transparent woods (TW) | Cs$_x$WO$_3$-TW | NO | 52.4 | - | 52.4 | - | - | - | - | - | - | - | [5] |
| | ATO-TW | NO | 50.9 | - | 50.9 | - | - | - | - | - | - | - | [6] |
| | VO$_2$-TW | -[3] | 50.2 | - | 50.2 | - | - | - | - | - | - | - | [7] |
| | TTHW | Yes | 39.8 | 82.7 | 61.3 | 38.1 | 23.5 | 22.2 | 22.9 | 1.3 | 120 | 180 | This Work |

Fig. 15

THERMOCHROMIC COMPOSITE MATERIAL, ITS PREPARATION AND USE

FIELD OF THE INVENTION

The present invention is related to a novel composite material in particular but not exclusive to a thermochromic composite material. The present invention also relates to the preparation of the composite material as well as the use of it in forming an article in particular but not exclusive to a window unit.

BACKGROUND

Energy demand in commercial and residential buildings accounts for around 40% of the total primary energy consumption, while nearly half of the energy in buildings is consumed by heating, ventilation and air-conditioning (HVAC) systems. In particular, such a huge amount of energy consumption is generally caused by the heat loss/gain through building envelopes, especially windows.

Currently, energy-efficient glazing techniques, including various electro-, thermo-, mechano- and photo-chromic smart windows is the mainstream to reduce the energy consumption via windows. These windows may dynamically modulate light transmittance according to the solar irradiation to economize building energy consumption. Among these techniques, it has been reported that much development has been focused on the passive thermochromic smart windows, owing to their specific capability to regulate the solar radiation between transparent and opaque states in response to the dynamic ambient temperature, which does not require any energy input.

Typically, thermally-responsive material(s) play a crucial role in triggering thermochromism of the smart windows. Examples of reported thermally-responsive material may include inorganic oxides, ionic liquids, and thermo-responsive polymers. However, it is reported that these materials may generally suffer from various inherent drawbacks such as undesirable transition temperature, instability, poor physical strength, etc. that hinder their application in smart windows.

For example, vanadium dioxide ($VO_2$) and ionic liquids generally require a high transition temperature ($T_c$) (i.e. at least 68° C.) to trigger their thermochromism, hindering their application in buildings; perovskites is generally considered to be unstable when it contacts with moisture, in particular in the presence of oxygen (i.e. being unstable in oxygen moisture environment), and therefore the long-term stability of perovskites smart windows remains doubt; thermochromic hydrogels such as poly(N-isopropylacrylamide) (PNIPAM) is generally in a gel state or applied in an aqueous medium in which it swells to a very high degree, resulting in low density of the polymer chains and therefore an extremely poor physical strength. Thus, in practice, thermochromic hydrogels must be sealed in a double-glazing system, which is in fact highly inconvenient for its application in windows.

Accordingly, there remains a strong need for novel materials, in particular thermochromic materials that can apply in smart window to address the high-energy consumption in buildings.

SUMMARY OF THE INVENTION

In a first aspect of the present invention, there is provided a composite material comprising:

a substrate body having a mesoporous structure defined by a network of interconnected fibers; and a thermochromic material comprising a hydrogel complex filling the mesoporous network, the hydrogel complex comprising a first polymer being a thermoresponsive hydrogel;

wherein the thermochromic material undergoes an increase or a decrease of transparency in response to an external temperature exceeding or falling below a critical transition temperature of the thermochromic material, thereby changing an overall transparency of the composite material.

In an embodiment, the plurality of interconnected fibers are aligned in a longitudinal direction of the substrate body.

In an embodiment, the plurality of interconnected fibers comprises hydroxyl groups, forming a hydrogen bond between each of the fibers.

In an embodiment, the plurality of interconnected fibers comprises cellulose.

In an embodiment, the substrate body comprises a mesoporous structure of delignified wood.

In an embodiment, the substrate body comprises a delignified wood, which is selected from the group consisting of delignified balsa wood, delignified bass wood, delignified birch wood, delignified pine, and a combination thereof.

In an embodiment, the thermoresponsive hydrogel comprises a plurality of microgel particles dispersed in the hydrogel complex.

In an embodiment, the hydrogel complex further comprises a second polymer being a refractive index-matching polymer, forming a first crosslinked network holding the microgel particles.

In an embodiment, the microgel particles have a diameter from about 200 nm to about 700 nm.

In an embodiment, the second polymer further forms a second crosslinked network with the plurality of interconnected fibers.

In an embodiment, the hydrogel complex comprises about 10% wt to about 40% wt of the second polymer with respect to the composite material.

In an embodiment, the refractive index-matching polymer is selected from the group consisting of epoxy, polyvinylpyrrolidone (PVP), poly(methyl methacrylate) (PMMA), poly(vinyl alcohol) (PVA), polydimethylsiloxane (PDMS), poly(acrylic acid), poly(acrylamide) (PAM), poly(aniline), poly(ethylene oxide), poly(N-acryloxysuccinimide), poly(N-isopropylacrylamide), poly(N-isopropylmethacrylamide), poly(N-vinylcaprolactam), poly(N-vinylpyrrolidone), poly(methacrylic acid), poly(styrene sulfonic acid), polyurethane, and poly(propylene oxide) (PPO), and a combination thereof.

In an embodiment, the thermoresponsive hydrogel is selected from the group consisting of poly(N-isopropylacrylamide) (PNIPAM), hydroxypropyl cellulose (HPC), polyampholyte hydrogel (PAH), N-vinylcaprolactam (PNVCL), ethylene glycol-modified pillar[5]arene (EGP5), and a combination thereof.

In an embodiment, the critical transition temperature is from about 20° C. to about 40° C.

In a second aspect of the present invention, there is provided a method of preparing the composite material according to the first aspect of the present invention. The method comprises the steps of:

a) preparing a substrate body having a mesoporous structure of delignified wood;

b) providing a precursor solution of the thermochromic material, the thermochromic material comprises a thermoresponsive hydrogel and a refractive index-matching polymer;

c) immersing the substrate body into the precursor solution under a reduced pressure; and d) curing the precursor solution at room temperature.

In an embodiment, step a) comprises the steps of:

i) immersing a portion of wood into a delignification solution to form a delignified wood substrate; and ii) isolating the delignified wood substrate.

In an embodiment, the delignification solution comprises the group consisting of sodium hypochlorite, sodium chlorite, sodium hydroxide, sodium sulfite, and a combination thereof.

In an embodiment, step b) comprises the steps of:

i) preparing a thermoresponsive hydrogel solution comprising microgel particles thereof; and ii) forming a homogeneous solution comprising a precursor of the refractive index-matching polymer and the thermoresponsive hydrogel solution.

In an embodiment, step bi) comprises the step of mixing a first thermoresponsive hydrogel monomer solution containing a surfactant with a second thermoresponsive hydrogel monomer solution containing a crosslinking agent.

In a third aspect of the present invention, there is provided a use of the composite material according to the first aspect of the present invention or the composite material obtained according to the second aspect of the present invention for forming an article.

In a fourth aspect of the present invention, there is provided a window unit comprising the composite material according to the first aspect of the present invention.

BRIEF DESCRIPTION OF THE DRAWINGS

FIG. 15 is a comparison of optical and transition properties among this study, previously various thermochromic smart windows, and energy-efficient transparent woods.

DESCRIPTION OF THE PREFERRED EMBODIMENTS

Figure 1:
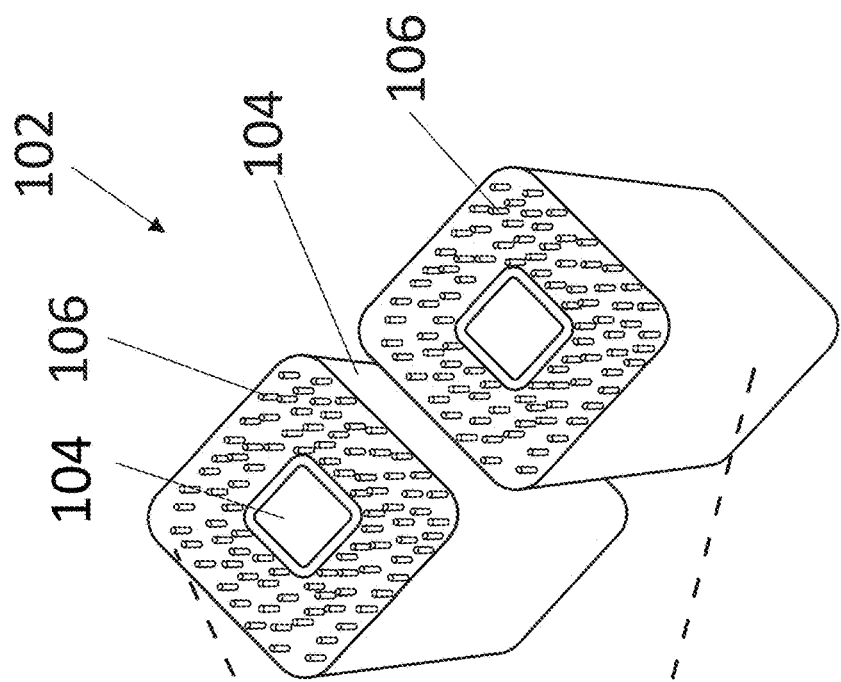
FIG. 1 shows a schematic diagram illustration of a vertical cross-section of a composite material prepared in an embodiment of the present invention, illustrating the mesoporous structure of a substrate body of the composite material.
Figure 1:
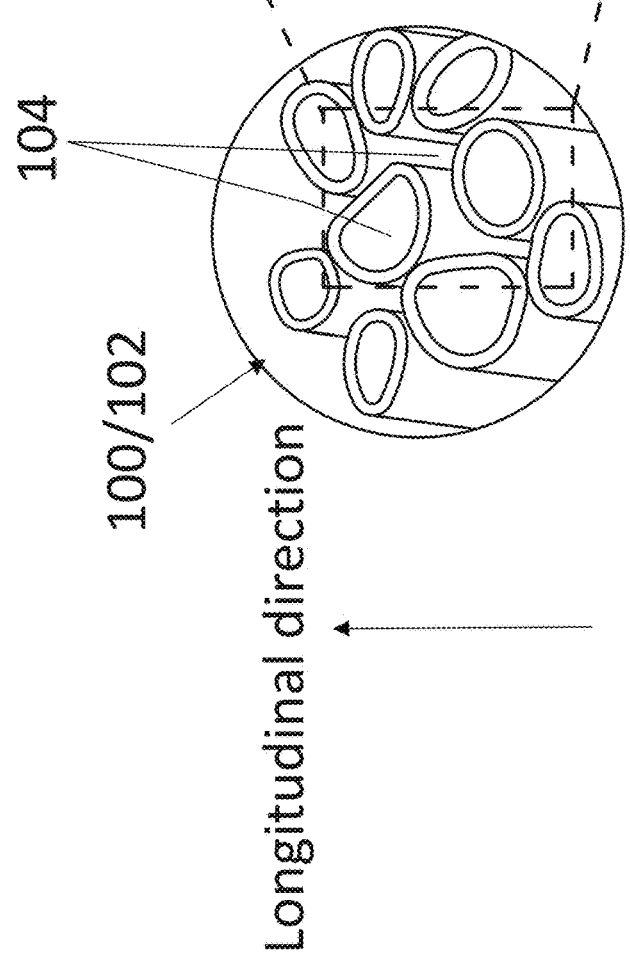

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise. It is understood that unless otherwise specifically noted, the materials compounds, chemicals, etc. described herein are typically commodity items and/or industry-standard items available from a variety of suppliers worldwide.

Typically, there are several criteria for a material to be suitable for window applications. For example, the material should be transparent to harvest the daylight, in particular in buildings. The material should also have strong mechanical properties so as to withstand any external forces such as storm or those from collision during normal use. The material and/or the manufacture thereof should be environmentally friendly and low cost. In some circumstances, the material may be required to have certain degree of haze for privacy purposes.

Among various materials, some of the biocompatible materials or biomaterials may be potential candidates for the above purposes. One of the potential candidates may be hydrogel. It is appreciated that hydrogel generally possesses three-dimensional crosslinked network structure that allows the hydrogel to hold a considerable amount of water and therefore providing the mechanism for hydrogel to disperse stress and to be highly flexible.

Another potential candidate may be wood. It is appreciated that wood is generally considered as a sustainable material, and the fabrication process thereof is generally environmentally friendly compared with, for example, glass production which produces a massive amount of $CO_2$. In addition, although wood possesses a porous microstructure/skeleton, its strong mechanical properties and low thermal conductivity remain attractive to various applications such as load-bearing, construction, and decoration. In particular, it is reported that wood may be configured to be transparent which allows its potential in window applications.

Without intending to be limited by theory, the inventors have, through their own researches, trials, and experiments, devised a composite material having a structure that can mimic both the hydrogel and wood microstructure. The composite material may possesses characteristics combining the advantages of the above two structures. In particular, the composite material may show advanced optical regulation ability (e.g. luminous transmittance ($T_{lum}$)=about 82.7% and about 39.8% at the cold and hot states, and solar modulation ability ($\Delta T_{sol}$)=about 38.1%), low transition temperature (e.g. $T_c$=about 22.9° C.), mechanically robust (e.g. Young Modulus ($\sigma$)=about 81.69 MPa) and low thermal conductivity (e.g. K=about 0.37 W m$^{-1}$ K$^{-1}$). In one example embodiment, the composite material may be able to reduce an indoor temperature by about 4.3° C., demonstrating the great potential of the composite material for use in energy-efficient buildings According to an aspect of the invention, there is provided a composite material comprising: a substrate body having a mesoporous structure defined by a plurality of interconnected fibers; and a thermochromic material comprising a hydrogel complex filling the mesoporous structure, the hydrogel complex comprising a first polymer being a thermoresponsive hydrogel;
wherein the thermochromic material undergoes an increase or a decrease of transparency in response to an external temperature exceeding or falling below a critical transition temperature of the thermochromic material, thereby changing an overall transparency of the composite material.

The composite material of some embodiments of the present invention is a wood-type/like composite material. The expressions "wood-type" or "wood-like" generally describe that the composite material may be made of wood, partially made of wood, or made of materials other than wood but having the characteristics of wood. The composite material may include wood component(s), structure of wood, in particular microstructure of wood, or any of the above after subjecting to chemical treatment, such as chemical functionalization, delignification, etc.

The composite material may comprise a substrate body having a mesoporous structure defined by a plurality of interconnected fibers. The phrase "mesoporous" generally denotes that a material or a structure having pores and/or cavities with diameters from about 2 nm to about 50 nm. As used herein, such phrase describes that the structure may have a network of cavities and/or pores, where each of the cavities and/pores has a diameter from about 2 nm to about 50 nm. In particular, such a network may be observed (for example by any microscopic means in the art) along the vertical cross-section of the substrate body.

The network of cavities and/or pores as mentioned above may be obtained by orienting each of the plurality of interconnected fibers in a particular direction. In particular, the plurality of interconnected fibers may be aligned in a longitudinal direction of the substrate body. For example, referring to FIG. 1, there is provided a schematic diagram illustrating a vertical cross-section of the mesoporous structure of a substrate body according to an embodiment of the present invention. As shown, the mesoporous structure 100 includes a network of cavities and/or pores 102, such as those with a diameter from about 2 nm to about 50 nm. Each of the cavities and/or pores 104 may be defined by a plurality of interconnected fibers 106, which are aligned in a longitudinal direction of the substrate body. In other words, the mesoporous structure 100 may have a plurality of cavities and/or pores ordered in the longitudinal direction of the substrate body. The plurality of interconnected fibers may be in form of a plurality of single fibers or may be in form of a plurality of bundles of microfibers. That being said, each of the cavities and/or pores in the network 102 may be defined by interconnecting and aligning a plurality of single fibers in the longitudinal direction of the substrate body or may be defined by interconnecting and aligning a plurality of bundles of microfibers in the longitudinal direction of the substrate body.

Each of the plurality of fibers may be connected to one another (i.e. interconnected) along the longitudinal direction of the substrate body. For example, it may be done by providing adhesives between the interfaces of each of the fibers, 3D printing each of the plurality of fibers to connect together, holding each of the fibers together by the formation of chemical bonding between the functional groups of the fibers, where the functional groups may be inherently present on the surface of the fibers or by chemical functionalization of the surface of the fibers.

In an embodiment, the plurality of fibers may include hydroxyl groups, which form a hydrogen bond between each of the fibers. Preferably, the hydroxyl groups are inherently present in/on the fibers. In particular, the hydroxyl groups may be provided by cellulose molecules of the fibers. That is, the plurality of interconnected fibers may include cellulose, or in other words, the plurality of interconnected fibers may be cellulose-based fibers. The expression "cellulose-based" generally describes that the fibers may be a cellulose fiber comes from nature, particularly from wood, or that the fibers may be a synthetic fiber, such as those prepared by 3D printing, which includes cellulose as one of the raw materials in the synthetic formulation. In a preferred embodiment, the plurality of interconnected fibers may be (natural) cellulose fibers.

In an embodiment, the substrate body may have a mesoporous structure of delignified wood. Such structure may be defined by a plurality of interconnected fibers, preferably by those including cellulose. As used herein, the expression "mesoporous structure of delignified wood" describes that it may be a mesoporous structure made of a natural wood after delignification (i.e. natural delignified wood), or it may be a mesoporous structure that is configured to resemble to the mesoporous structure of natural delignified wood. For example, the resembling mesoporous structure may be prepared by way of molding a plastic into such structure or of 3D printing techniques such as extruding and stacking a plurality of synthetic cellulose fibers as mentioned above to form the resembling mesoporous structure.

As specific embodiments, the substrate body may be a delignified wood, i.e. the substrate body may have a mesoporous structure of natural delignified wood. The delignified wood may be selected from those with light weight prior to delignification, particularly with a density of, for example, from about 100 kg m$^{-3}$ to about 250 kg m$^{-3}$ prior to delignification. Preferably, the delignified wood may be selected from the group consisting of delignified balsa wood, delignified bass wood, delignified birch wood, delignified pine, and a combination thereof.

The expression "mesoporous structure of natural delignified wood" as used herein shall be understood by those skilled in the art that such structure may generally refers to a network including an array of ordered microchannels, and each of them may have an opening with a diameter from about 2 nm to about 50 nm. Each of the microchannels may be defined by a plurality of (natural) cellulose fibers aligned in a longitudinal direction, i.e. the growth direction of the wood, and each of the cellulose fibers may be interconnected with each other by forming hydrogen bond along the longitudinal direction of the fibers. Each of the adjacent microchannels may therefore connect to one another to form a network via their respective cellulose fibers.

The mesoporous structure may be filled with a thermochromic material including a hydrogel complex. The phrases "filled" or "filling" generally denote that the thermochromic material occupies the mesoporous structure as defined herein to a certain percentage, in particular to at least 50%, at least 70%, from about 75% to about 100%, from about 80% to about 99%, from about 85% to about 98%, from about 90% to about 100%, from about 95% to about 99%, from about 97% to about 100%, from about 98% to about 100%, about 99% (i.e. substantially fully occupies the mesoporous structure), or preferably about 100% (i.e. fully occupies the mesoporous structure). The term "thermochromic material" as used herein particularly refers to a material such as a polymer that undergoes a phase change/transition, particularly from a solid state to a liquid state or vice versa in response to an external temperature change, particularly to an extent exceeding or falling below a critical transition temperature of the thermochromic material.

The term "hydrogel complex" as used herein denotes a material that has at least two of its components are different hydrogels, where each of the hydrogels is present as an individual entity within the material. The two different (hydrogel) entities may interact with one another by forming chemical and/or physical crosslinking. Examples may include covalent or ionic bonding with a crosslinking agent (or crosslinker), hydrogen bonding, van der Waals forces, electrostatic interaction and the like. It should be noted that the hydrogel complex as described herein is different from the concept of copolymer. The concept of hydrogel complex pertains to a molecular entity formed by at least two different individual hydrogel polymers interacting with each other, whereas the general concept of copolymer pertains to an individual molecular entity formed by two different monomers bonding together. The term "hydrogel" as used herein shall be understood by those skilled in the art that it generally refers to a crosslinked polymer, particularly hydrophilic polymer with a variable amount of water retained therein.

The hydrogel complex may include a first polymer being a thermoresponsive hydrogel. The thermoresponsive hydrogel may include a plurality of microgel particles dispersed in the hydrogel complex. The microgel particles may be capable of changing their sizes in response to external temperature, which generally gives rise to the thermochromism of the thermochromic material. Details of the thermochromism will be discussed in the later part of disclosure.

In an embodiment, the thermoresponsive hydrogel may be selected from the group consisting of poly(N-isopropylacrylamide) (PNIPAM), hydroxypropyl cellulose (HPC), polyampholyte hydrogel (PAH), N-vinylcaprolactam (PNVCL), ethylene glycol-modified pillar[5]arene (EGP5), and a combination thereof. The microgel particles of the thermoresponsive hydrogel may be dispersed in a crosslinked network within the hydrogel complex. In particular, the hydrogel complex may further include a second polymer being a refractive index-matching polymer, which may form a first crosslinked network holding the microgel particles of the thermoresponsive hydrogel. The first crosslinked network may include a plurality of second polymer chains (i.e. refractive index-matching polymer chains) interacting/interconnecting with each other via hydrogen bonding, forming a skeleton network for holding the microgel particles and any water molecules within the crosslinked network. In particular, the plurality of second polymer chains may interact with the microgel particles by forming hydrogen bond therewith so as to hold and keep the microgel particles as well as water molecules inside the network.

The microgel particles may have a variable diameter in response to the external temperature change, which in turn giving rise to the thermochromism of the thermochromic material. In particular, the microgel particles may have a diameter from about 200 nm to about 700 nm, from about 200 nm to about 690 nm, from about 210 nm to about 690 nm, from about 220 nm to about 680 nm, or from about 220 nm to about 670 nm.

In an example embodiment, the microgel particles may have an average diameter of about 670 nm when the external temperature is below a critical temperature of the thermochromic material, i.e. at the cold state of the thermochromic material. When the external temperature rises to an extent that is higher than the critical temperature of the thermochromic material (i.e. at the hot state of the thermochromic material), the average diameter of the microgel particles may decrease to about 220 nm. Such a thermoresponsive change of average diameter of the microgel particles may give rise to the thermochromism of the composite material as explained below.

Figure 2:
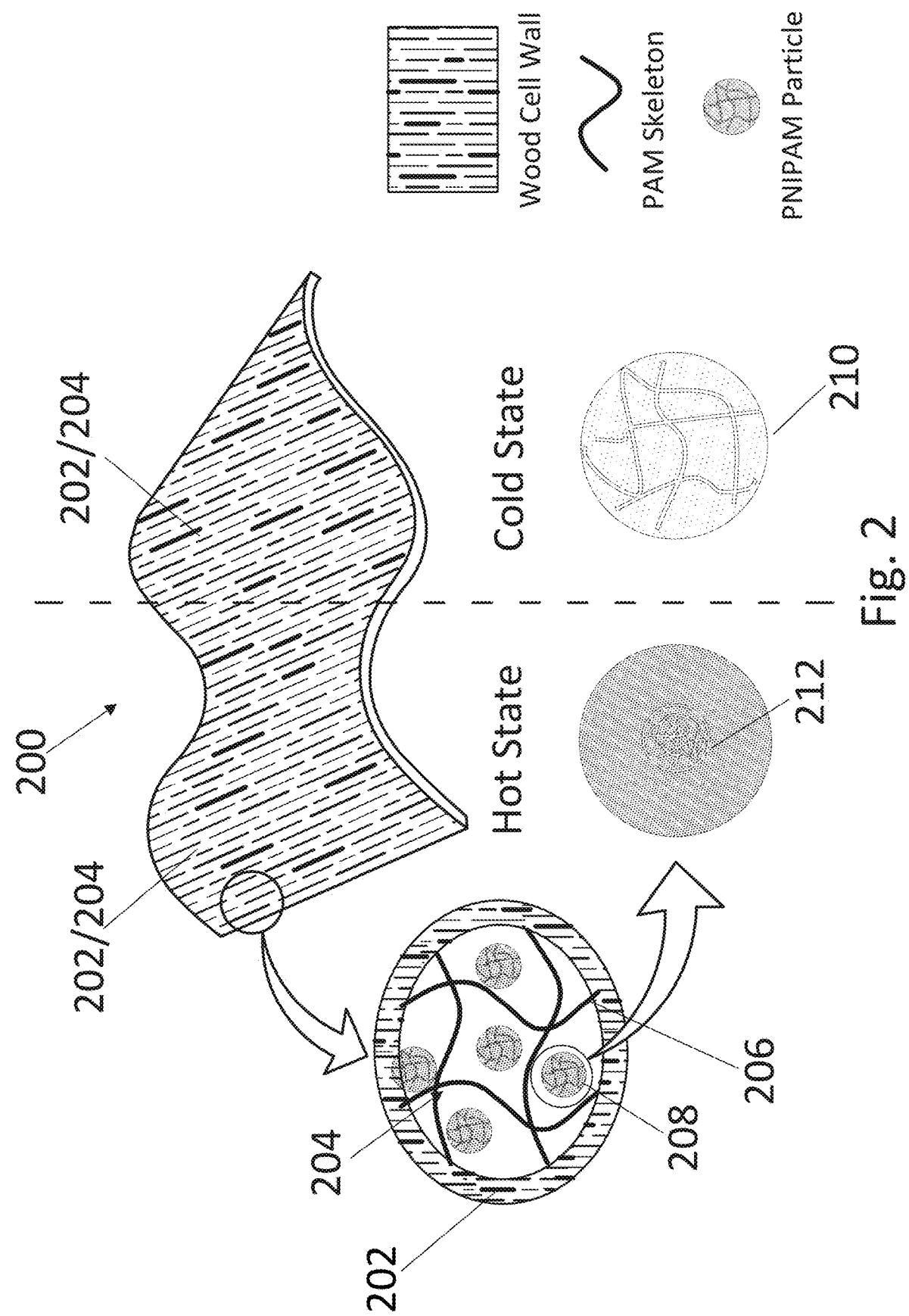
FIG. 2 shows a schematic diagram illustration of a composite material prepared in an embodiment of the present invention and the internal components thereof as well as the mechanism of thermochromism of the composite material.

With reference to FIG. 2, there is provided a schematic diagram illustrating a composite material according to an embodiment of the present invention. The composite material 200 may have a substrate body having a mesoporous structure of delignified wood 202, filled with a thermochromic material 204. The thermochromic material 204 may have a hydrogel complex including a crosslinked network/skeleton of a refractive index-matching polymer 206, holding, by the formation of, for example, hydrogen bond, a plurality of microgel particles of a thermoresponsive hydrogel 208 as well as water molecules (not shown) therein. At the cold state (i.e. the external temperature is substantially lower than the critical temperature of the thermochromic material 204), the microgel particles 208 may hold a certain amount of water by forming, for example, hydrogen bonding with adjacent water molecules, and therefore forming a swollen structure 210, or in other words being in a hydrophilic swollen state. As such, the polymer chains of the microgel particles may be in a more dispersed arrangement, such that more light may be pass through the hydrogel complex (i.e. weaker light scattering), resulting in an optically transparent appearance of the thermochromic material. At hot state (i.e. the external temperature is substantially higher than the critical temperature of the thermochromic material), the microgel particles may transfer from the hydrophilic swollen state to the hydrophobic shrunken state (i.e. transfer from a swollen structure 210 to a shrunken structure 212). As such, there may be a significant increase in refractive index between the (shrunken) microgel particles and the water, causing strong light scattering within the hydrogel complex and therefore resulting in an optically opaque appearance of the thermochromic material.

Other than forming the first crosslinked network as mentioned above for holding the microgel particles, in an embodiment, the second polymer/the refractive index-matching polymer may further form a second crosslinked network with the mesoporous structure of delignified wood as defined herein. In particular, each of the plurality of second polymer chains/refractive index-matching polymer chains may interact with each of the plurality of interconnected fibers, particularly (natural) cellulose fibers via hydrogen bond formation. In this way, the hydrogel complex not only to be tightly trapped and supported by the mesoporous structure, but also facilitate and/or enhance the overall transparency of the composite material.

Although it is reported that the mesoporous structure of delignified wood, particularly of natural wood would become more optically transparent in respect to the original one (i.e. without undergoing delignification), it is appreciated that the mesoporous structure of delignified wood would generally remain opaque as a result of the strong light scattering caused by a refractive index mismatch between the delignified wood mesoporous structure and air. As such, the inventor have, through their own research, trials, and experiments, found that by incorporating the delignified wood mesoporous structure with a refractive index-matching polymer having a refractive index comparable to wood, it may enhance the optical transparency of the delignified wood mesoporous structure, thereby enhancing the (overall) optical transparency of the composite material.

In particular, the refractive index-matching polymer may have a refractive index from about 1.5 to about 1.53. Preferably, the refractive index-matching polymer may be selected from the group consisting of epoxy, polyvinylpyrrolidone (PVP), poly(methyl methacrylate) (PMMA), poly(vinyl alcohol) (PVA), polydimethylsiloxane (PDMS), poly(acrylic acid), poly(acrylamide) (PAM), poly(aniline), poly(ethylene oxide), poly(N-acryloxysuccinimide), poly(N-isopropylacrylamide), poly(N-isopropylmethacrylamide), poly(N-vinylcaprolactam), poly(N-vinylpyrrolidone), poly(methacrylic acid), poly(styrene sulfonic acid), polyurethane, and poly(propylene oxide) (PPO), and a combination thereof. In a preferred embodiment, the refractive index-matching polymer may be poly(acrylamide) (PAM).

The refractive index-matching polymer may have a mass concentration from about 10% wt to about 40% wt, from about 15% wt to about 40% wt, from about 20% wt to about 40% wt, from about 25% wt to about 40% wt, from about 25% wt to about 35% wt, about 28% wt, or in particular about 30% wt, with respect to the composite material. That being said, the hydrogel complex may have about 10% wt to about 40% wt (or any mass concentration as defined above) of the second polymer being the refractive index-matching polymer with respect to the composite material.

The inventors have found that the mass concentration of the refractive index-matching polymer in the thermochromic material may affect the critical temperature of the thermochromic material. The term "critical temperature" as used herein generally denotes a temperature threshold at which when the external temperature exceeds or falls below of such, the thermochromic material will, in response, undergo a phase transition from a solid state to a liquid state or vice versa, resulting in a change of optical transparency from an optically opaque state to an optically transparent state or vice versa. In particular, the thermochromic material may undergo a phase transition from a solid state to a liquid state (or from an optically opaque state to an optically transparent state) when the external temperature falls below the critical temperature and vice versa when the external temperature exceeds (i.e. higher than) the critical temperature. In an embodiment, the thermochromic material may have a critical temperature from about 20° C. to about 40° C. Such critical temperature may be adjusted to a temperature from about 20° C. to about 35° C., from about 20° C. to about 30° C., from about 20° C. to about 25° C., from about 21° C. to about 25° C., about 22° C., or in particular about 23° C., with respect to the mass concentration of the refractive index-matching polymer as described above.

The composite material of some embodiments of the present invention as described herein may possess the following optical, thermal, and mechanical properties.

In an embodiment, the composite material may have a luminous transmittance ($T_{lum}$) of about 82.7% at the cold state and of about 39.8% at the hot state.

In an embodiment, the composite material may have a solar modulation ability ($\Delta T_{sol}$) of about 38.1%.

In an embodiment, the composite material may have an optical haze of about 90%, in particular in the visible light region.

In an embodiment, the composite material may have a Young Modulus ($\sigma$) of about 81.69 MPa, in particular along the growth direction as mention above.

In an embodiment, the composite material may have a thermal conductivity (K) of about 0.37 W m$^{-1}$ K$^{-1}$.

A method of preparing the composite material is described below, i.e. for preparing a composite material comprising:

a substrate body having a mesoporous structure defined by a plurality of interconnected fibers; and a thermochromic material comprising a hydrogel complex filling the mesoporous structure, the hydrogel complex comprising a first polymer being a thermoresponsive hydrogel and a second polymer being a refractive index-matching polymer;

where the substrate body having a mesoporous structure of delignified wood defined by a plurality of interconnected fibers comprising cellulose.

The method generally includes the steps of:

providing a substrate body having the mesoporous structure of delignified wood;

providing a thermochromic material including a hydrogel complex of the thermoresponsive hydrogel and the refractive index-matching polymer; and incorporating the thermochromic material into the substrate body.

The mesoporous structure of delignified wood, as defined herein, may be a mesoporous structure made of a natural wood after delignification (i.e. natural delignified wood), or it may be a mesoporous structure that is configured to resemble to the mesoporous structure of natural delignified wood, such as those prepared by way of molding a plastic into such structure or of 3D printing techniques as mentioned above.

The thermoresponsive hydrogel may be selected from the group consisting of poly(N-isopropylacrylamide) (PNIPAm), hydroxypropyl cellulose (HPC), polyampholyte hydrogel (PAH), N-vinylcaprolactam (PNVCL), ethylene glycol-modified pillar[5]arene (EGP5), and a combination thereof;

The refractive index-matching polymer may be selected from the group consisting of epoxy, polyvinylpyrrolidone (PVP), poly(methyl methacrylate) (PMMA), poly(vinyl alcohol) (PVA), polydimethylsiloxane (PDMS), poly(acrylic acid), poly(acrylamide) (PAM), poly(aniline), poly(ethylene oxide), poly(N-acryloxysuccinimide), poly(N-isopropylacrylamide), poly(N-isopropylmethacrylamide), poly(N-vinylcaprolactam), poly(N-vinylpyrrolidone), poly(methacrylic acid), poly(styrene sulfonic acid), polyurethane, and poly(propylene oxide) (PPO), and a combination thereof.

The method as described above is suitable for preparing a composite material including a substrate body being a delignified wood (i.e. with a mesoporous structure of natural delignified wood as defined herein), where the delignified wood may be selected from the group consisting of delignified balsa wood, delignified bass wood, delignified birch wood, delignified pine, and a combination thereof. The method comprises the steps of:
a) preparing a substrate body having a mesoporous structure of delignified wood;
b) providing a precursor solution of the thermochromic material, the thermochromic material comprises a thermoresponsive hydrogel and a refractive index-matching polymer;
c) immersing the substrate into the precursor solution under a reduced pressure; and
d) curing the precursor solution at room temperature.

Step a) in particular comprises the steps of:
i) immersing a portion of wood into a delignification solution to form a delignified wood substrate; and
ii) isolating the delignified wood substrate,
where optionally, step ai) includes the step of obtaining the portion of wood from a natural wood by rotary cutting method.

In step ai), the portion of wood may be immersed in a delignification solution includes the group consisting of sodium hypochlorite, sodium chlorite, sodium hydroxide, sodium sulfite, and a combination thereof, for delignification. The delignification process may be carried out for at least 12 hours at room temperature.

The expression "isolating" as used in the step above means separating the delignified wood substrate as mentioned above from other components such as side products, the reactants and the solvent present in the delignification solution in or after step ai). The isolating step in particular may include washing the as prepared/crude delignified wood substrate with a washing solvent such as ethanol, deionized water and the like.

Step b) in particular comprises the steps of:
i) preparing a thermoresponsive hydrogel solution comprising microgel particles thereof; and
ii) forming a homogeneous solution comprising a precursor of the refractive index-matching polymer and the thermoresponsive hydrogel solution.

Step bi) may comprise the step of mixing a first thermoresponsive hydrogel monomer solution containing a surfactant with a second thermoresponsive hydrogel monomer solution containing a crosslinking agent. In particular, this step may include the following steps:
preparing a mixture of the first thermoresponsive hydrogel monomer solution and the surfactant such as sodium dodecyl sulfate (SDS) under stirring, such as at a rate of about 1000 rpm;
adding an initiator to the mixture obtained in the step above to form a pre-reaction mixture;
preparing a mixture of the second thermoresponsive hydrogel monomer solution and the crosslinking agent; and
adding the second thermoresponsive hydrogel monomer solution to the pre-reaction mixture at a controlled manner such as at an addition rate of about 100 µL/min.

Step bii) may include the following steps:
mixing a monomer of the refractive index-matching polymer, a crosslinking agent, and an initiator, with the thermoresponsive hydrogel solution; and
adding a catalyst such as N, N, N, N-tetramethylethylenediamine (TEMED) to the above mixture.

The crosslinking agent as described above is preferably N, N'-methylenebis(acrylamide) (MBAA).

The initiator as described above is preferably a persulfate compound such as ammonium persulfate (APS), potassium persulfate (KPS) and the like.

The immersion of the substrate body in step c) may be repeated for at least three times to ensure the substrate body is fully filled with the precursor solution of the thermochromic material.

The curing process in step d) may be carried out for at least 12 hours.

Preferably, the method is suitable for preparing a composite material, in particular the composite material including a substrate body of delignified balsa wood, the mesoporous structure of which is filled with a thermochromic material including a hydrogel complex of poly(N-isoproylacrylamide) (PNIPAM) and poly(acrylamide) (PAM) (i.e. PNIPAM-PAM).

The composite material, particularly the composite material comprising a substrate body being a delignified wood, the mesoporous structure of which is filled with the thermochromic material as defined herein, is suitable for or specifically designed for use in forming an article.

As mentioned above, the composite material of some embodiments of the present invention may possess various optical, thermal, and mechanical properties, which allow the composite material to be used in forming an article. The article may be of various forms, examples including a window unit such as a conventional window, a roof window, etc., an umbrella such as beach umbrella, a heat-insulation cup cover, etc. that is made of the composite material; or in form of a pad or a film that can be applied to a window, including conventional window, roof window, etc. for modulating the indoor illumination, privacy, and/or temperature, a film that can be applied to an umbrella, such as a beach umbrella for sun-blocking, etc. It is appreciated that the composite material may be used via any known method in the art that is compatible with the components of the article.

Another aspect of the invention relates to a window unit comprising the composite material of some embodiments of the present invention, particularly the composite material comprising a substrate body being a delignified wood, the mesoporous structure of which is filled with the thermochromic material as defined herein. The window unit may be a window component or the window itself.

In an embodiment, the window unit may include a window component being fixed/secured within a window frame. It is appreciated that the window component may be fixed/secured to the window frame by any compatible method known in the art. The window component may comprise a window glass and a pad or a film of the composite material of some embodiments of the present invention disposed on the window glass. The pad/film of the composite material may be disposed on a first plane of the window glass that is facing to the external environment or may be disposed on a second plane of the window glass that is facing toward the indoor environment. Preferably, the pad/film of the composite material is disposed on the second plane of the window glass that is facing toward the indoor environment. Advantageously, the inventor have unexpectedly determined that a window unit with the above mentioned configuration, may reduce the indoor air temperature by about 4.3° C., and may save about 2.6% to about 10% of energy consumption over a year.

In an alternative embodiment, the composite material may replace the window glass, directly being fixed/secured to the window frame to form a window unit.

In another embodiment, the window unit itself may be the composite material. That is, the composite material of some embodiments of the present invention may be configured in a window shape that can be directly applied to a building or compartment.

EXAMPLES

Instrumentation and Methods of Characterization

The particle size of PNIPAM microgel was analyzed by a dynamic light scattering particle size analyzer (Malvern Zetasizer Nano ZS). Fourier transform infrared (FTIR) spectroscopy was performed using a fourier transform infrared spectrophotometer IRAffinity-1S (SHIMAZU) equipped with attenuated total reflectance (ATR) system. A ZEISS EVO MA10 scanning electron microscope was used for characterizing the cross-section morphologies of the samples with a layer of gold sputtered on the sample surface (Quorum Technologies Q150T ES).

To measure the transition temperature, the samples were heated on a hot plate from 15° C. to 35° C. and then cooled back by a tailor-made electronic cooling plate, at intervals of 1.5° C. Simultaneously, under each temperature, the visible light transmittance of the samples was measured using a Lens Transmission meter (SPEEDRE SDR8508) at 550 nm wavelength. Transition temperature ($T_c$) of the TTHW was determined by plotting the first derivative of the transmittance to the temperature as a function of temperature $$(\text{i.e.} \frac{dTr}{dT},$$

where $T_r$ is the transmittance of the TTHW samples at 550 nm wavelength and Tis the temperature), and $T_c$ is the temperature showing the minimum value at the first derivative. For the transition time measurement, the sample was placed on the hot plate or cooling plate which set at the transition temperature of TTHW during the heating and cooling processes, and the time-dependent transmittance of the sample was monitored by the Lens Transmission meter.

The transmittance spectra of TTHW at the cold and hot states were measured by a UV-VIS-NIR spectrophotometer (SHIMADZU UV3600). Two vital indices were calculated to quantify the optical performance of TTHW, namely the luminous transmittance ($T_{lum}$) and solar modulation ability ($\Delta T_{sol}$). $T_{lum}$ is the amount of visible light transmitted by the windows that is useful for human vision under normal conditions, which is defined as $$T_{lum} = \frac{\int_{\lambda=380nm}^{780nm} \overline{y}(\lambda)T(\lambda)d\lambda}{\int_{\lambda=380nm}^{780nm} \overline{y}(\lambda)d\lambda},$$

where $T(\lambda)$ is the transmittance of the windows at wavelength $\lambda$. $\overline{y}(\lambda)$ is the photopic luminous efficiency of the human eye as defined by the CIE (International Commission on Illumination) standard. The wavelength range of 380 nm-780 nm corresponds to the limits of human vision. The solar transmittance ($T_{sol}$) is the integral transmittance under AM 1.5 solar irradiation and is given by $$T_{sol} = \frac{\int_{\lambda=300nm}^{2500nm} AM_{1.5}(\lambda)T(\lambda)d\lambda}{\int_{\lambda=300nm}^{2500nm} AM_{1.5}(\lambda)d\lambda},$$

the solar modulation ability ($\Delta T_{sol}$) of a thermochromic window describes the solar transmittance between cold ($T_{sol,cold}$) and hot ($T_{sol,hot}$) states and it is calculated as $\Delta T_{sol} = T_{sol,cold} - T_{sol,hot}$.

The calculation of haze, based on ASTM D1003 "Standard Method for Haze and Luminous Transmittance of Transparent Plastics", is defined as:

$$\text{Haze} = \left(\frac{T_4}{T_2} - \frac{T_3}{T_1}\right) \times 100\%,$$

where $T_1$ is the incident light, $T_2$ is the total light transmitted by the sample, $T_3$ is the light scattered by the equipment, and $T_4$ is the light scattered by the sample and equipment. It should be noted that for measurement of the transition properties in Example 2 below, the Lens Transmission meter was used to measure the transmittance data at 550 nm. As the TTHW samples have to be instantaneously heated and cooled to a specific temperature to measure their transmittance values, it is necessary to achieve the temperature dependent transmittance in real time. Besides, the trend of transmittance varying with temperature is also the key for measurement of the transition properties. Therefore, the full-spectrum transmittance is not necessary, but the transmittance data at a typical wavelength of 550 nm is sufficient to obtain the data for the temperature dependent transmittance measurement. Therefore, the Lens Transmission meter (SPEEDRE SDR8508) which can scan the transmittance in real time was selected to measure the transmittance in the characterization of transition properties. In addition, it should be noted that the Lens Transmission meter (SPEEDRE SDR8508) does not have an integrating sphere, so it can only collect the specular transmission.

Regarding the full-wavelength optical transmittance measurement in Example 3 below, the UV-VIS-NIR spectrophotometer (SHIMADZU UV3600) equipped with an integrating sphere has to be utilized to spatially integrate the radiant flux in scattering transmission to obtain the actual transmittance spectrum (i.e. specular transmission+diffuse transmission) of the TTHW because of the high haze of the TTHW.

To characterize the mechanical properties, a tensile tester (Instron 5567) was used to test the tensile stress and strain of the TTHW sample having a size of 9 cm (L)×1 cm (W)×0.15 cm (T). The test followed the Standard test method for tensile properties of polymer matrix composite materials (ASTM Committee D-30 on Composite Materials).

The thermal conductivities of the TTHW samples together with the other materials (i.e. original wood, PNIPAM-PAM hydrogel and glass) were measured using a transient hot-wire thermal conductivity meter (TC3000E, XIATECH). In the measurement process, the hot-wire that acts as a heating element and a thermometer was sandwiched between two identical test samples. As the hot wire is heated, a time-dependent temperature field within the tested material can be produced, and thus, the thermal conductivity can be determined from the resulting temperature change over a known time interval.

Example 1

Preparation of Thermochromic Transparent Hydrogel Wood (TTHW)

Figure 3:
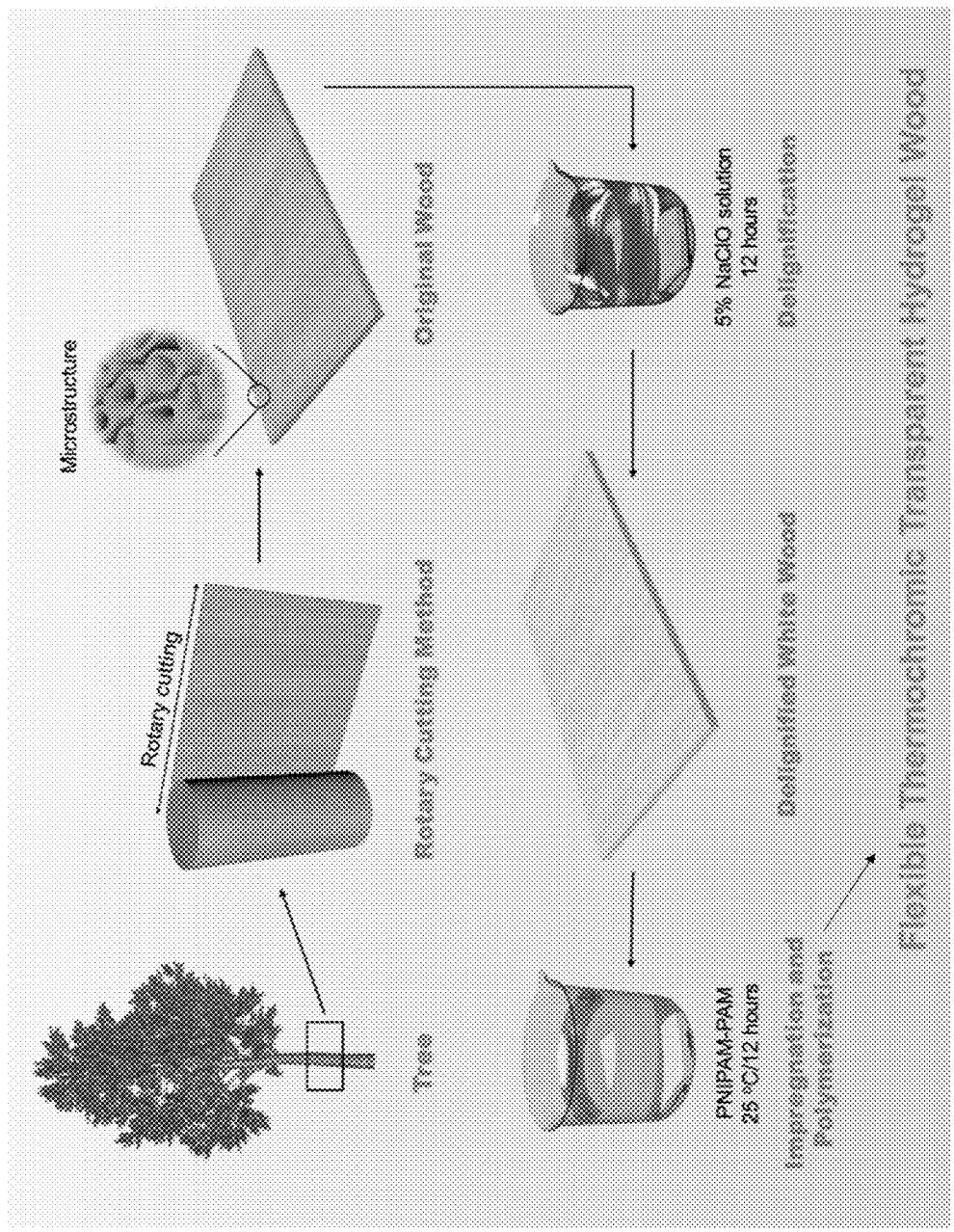
FIG. 3 shows a schematic diagram illustration of a fabrication process of the composite material of some embodiments of the present invention.

The fabrication process of TTHW is illustrated in FIG. 3. Balsa wood was selected as the raw material in this study since it is one of the lightest woods (i.e. 100-250 kg m$^{-3}$) and is widely used as commercial timber. In addition, its fast growth rate and thick trunk (i.e. reaching up to 75 cm in diameter and around 20 m in height in about 5-8 years) make it suitable for large-scale cutting methods (e.g. rotary cutting).

It is appreciated that the wood cell wall mainly consists of cellulose, hemicellulose, and lignin, which form a natural fibril-based composite. However, the distinct refractive-index of these components (n=1.53 for cellulose and hemicellulose) and air (n=1.0), and the chromophoric and auxochrome groups in lignin, generally lead to high opacity in natural wood. To fabricate the transparent wood, a balsa wood slice (90×90×1.5 mm) was first treated with NaClO to remove both lignin and hemicellulose. Specifically, the balsa wood slice was immersed into a sodium hypochlorite solution (NaClO, available Cl≥5%, Aladdin) for 12 hours at room temperature. Next, the crude delignified wood slice was rinsed several times by deionized water and ethanol. The delignified wood slice was then stored in a 95% ethanol solution at 4° C. for subsequent experiments.

After the delignification process, the wood exhibited thinner cell walls and more pores that provide space for polymer impregnation to achieve transparency. The delignified wood appeared white in color due to the light reflecting on the surface and the scattering in the microchannels of the bleached wood. To achieve both transparency and thermochromism, PNIPAM-PAM hydrogel was impregnated into the delignified wood skeleton with vacuum assistance. A continuous monomer feeding method was employed to synthesize the PNIPAM microgel particles. Specifically, the PNIPAM was synthesized by mixing two monomer solutions. The first batch of the solution was prepared by dissolving 0.165 g N-isopropylacrylamide (NIPAM, 99%, Sigma-Aldrich) in 6.85 mL deionized (DI) water. The solution was then injected into a reaction vessel with 106.5 mL DI water at 80° C. and purged with $N_2$. The second batch of the solution was prepared by dissolving 1.68 g NIPAM and 84 mg N,N'-methylenebis(acrylamide) (BIS also known as MBAA), 99%, Sigma-Aldrich) into 10.9 mL DI water, and the mixture was then transferred into a syringe. Then, 0.38 mL of 0.19 M sodium dodecyl sulfate (SDS, J&K Chemical) was injected into the reaction vessel and stirred at 1000 rpm. To initiate the chemical reaction, 0.38 mL of 0.36 M ammonium persulfate (APS, ≥98%, Sigma-Aldrich) was added. After 1 minute, the second batch of the solution was injected into the reaction vessel at a rate of 100 µL/min using a syringe pump. The reaction was stopped after all monomers were fed.

Figure 4B:
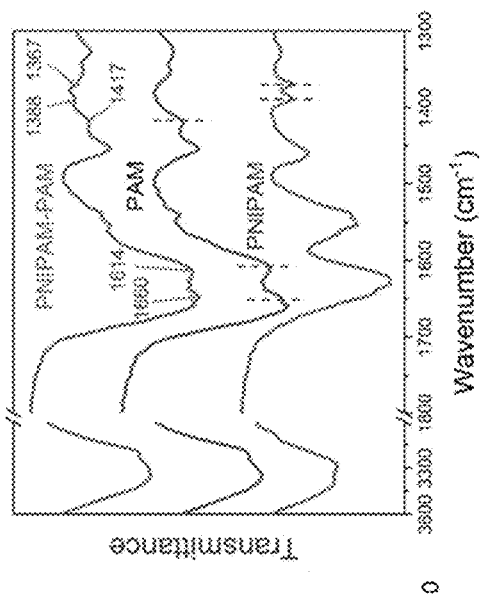
FIG. 4B shows FTIR spectra of PNIPAM-PAM, PNIPAM and PAM hydrogels.
Figure 4A:
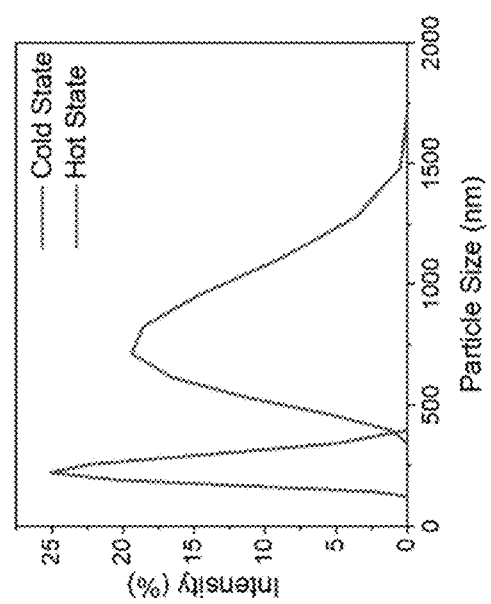
FIG. 4A shows diameter distribution curves of PNIPAM microgels in aqueous dispersion.

The size distribution of the as formed microgel particles are investigated. The size distribution curve of an aqueous dispersion of PNIPAM microgel is shown in FIG. 4A. As shown, the microgel particles exhibit a unimodal distribution with an average diameter of about 674 nm at the cold state, whereas when the temperature increased to 40° C., the average diameter of PNIPAM microgel particles decreased to about 223 nm. This may be because the PNIPAM microgel particles transfer from a hydrophilic swollen state to a hydrophobic shrunken state (see FIG. 2) when the ambient temperature is higher than its transition temperature. The greatly increased refractive index between the microgel particles and solvent (e.g. water) after phase transfer caused strong light scattering, leading to opacity at the hot state.

It is appreciated that PNIPAM microgel was originally in a viscous flow state, which could lead to leakage issues. In order to solve this problem, a PAM hydrogel skeleton in solid state was formed by dissolving acrylamide (AM) monomers in the aqueous dispersion of PNIPAM microgel. In addition, the PNIPAM-PAM composite was impregnated into the delignified wood so as to encapsulate and further enhance the mechanical strength of the PNIPAM-PAM composite. Specifically, 15 g acrylamide (Sigma-Aldrich), 10 mg BIS and 100 mg potassium persulfate (KPS) were dissolved in 50 ml PNIPAM solution, and then mixed in an ice-water bath to obtain a homogeneous solution. After that, 150 µL of N,N,N,N-tetramethylethylenediamine (TEMED, Sigma-Aldrich) was added to the homogeneous solution. The delignified wood was immersed in the solution and impregnated under a vacuum condition. The impregnation process was rapidly repeated three times to ensure full impregnation. Finally, the wood slice was solidified at 25° C. for 12 hours to obtain the TTHW.

The chemical composition of PNIPAM-PAM hydrogel was verified by Fourier transform infrared (FTIR) spectroscopy. As shown in FIG. 4B, the three characteristic absorption peaks at ~1660 cm$^{-1}$, ~1614 cm$^{-1}$ and ~1417 cm$^{-1}$ in the FTIR spectrum of PNIPAM-PAM can be attributed to the amide I band (C=O stretching), amide II band (N—H bending) as well as amide III band (C—N stretching) of PAM. Two characteristic peaks at 1367 cm$^{-1}$ and 1388 cm$^{-1}$ in the PNIPAM-PAM spectrum can be assigned to the deformation vibration in C—H bond of the isopropyl group of PNIPAM. The presence of the characteristic peaks mentioned above indicates the successful synthesis of PNIAPM-PAM hydrogel.

Figure 4C:
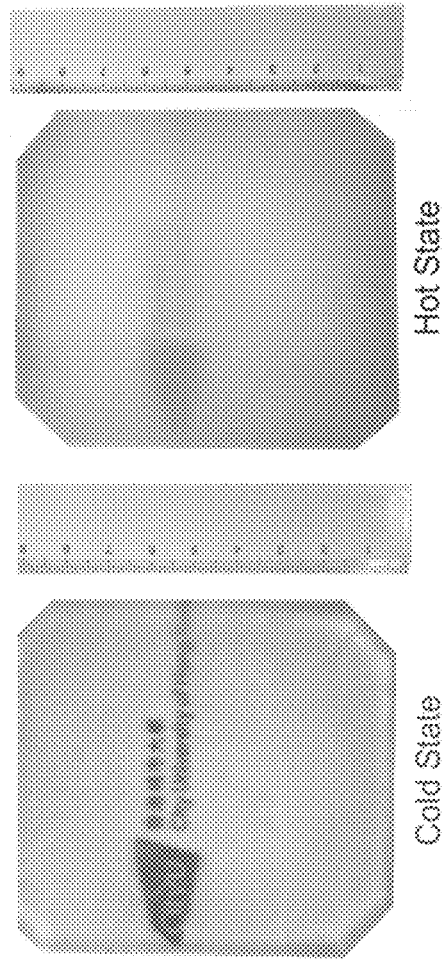
FIG. 4C shows photos of TTHW at cold and hot states.

Following the impregnation process, the wood slice was solidified at room temperature for 12 hours, after which the TTHW sample was achieved as shown in FIG. 4C.

Figure 5B:
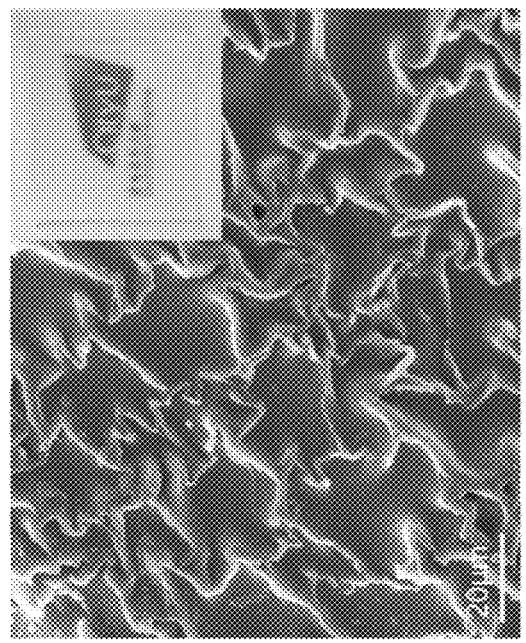
FIG. 5B shows a SEM image of cross-section of TTHW.
Figure 5A:
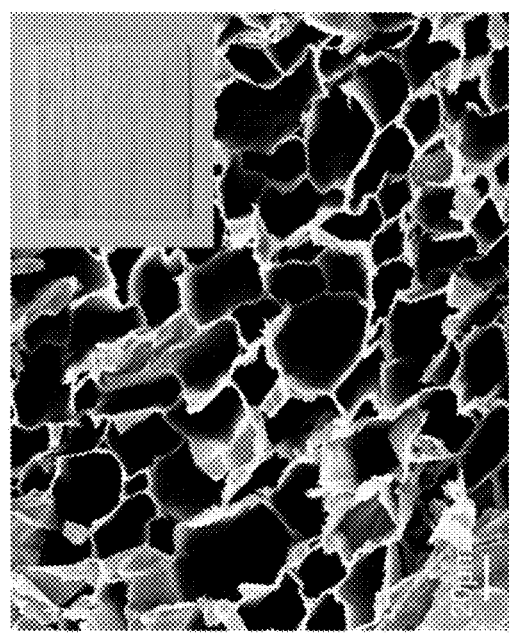
FIG. 5A shows a SEM image of cross-section of original balsa wood.

The microstructural morphology of the TTHW was investigated by SEM. FIG. 5A and FIG. 5B show the cross-sectional SEM images of original balsa wood and TTHW, respectively. It can be seen from the microstructure of the TTHW that the aligned channels of the wood have been completely filled with PNIPAM-PAM, resulting in the densely packed composite (FIG. 5B), indicating the successful fabrication of TTHW.

Example 2

Transition Properties of TTHW

The TTHW undergoes a phase transition from the transparent state to the opaque state at a certain temperature, defined as the transition temperature (Ta). For the application of thermochromic material on smart windows, it is appreciated that a suitable transition temperature (about 20° C. to about 25° C.) is vital to trigger the optical change at a proper point to maximize the energy-efficient benefit.

Figure 6B:
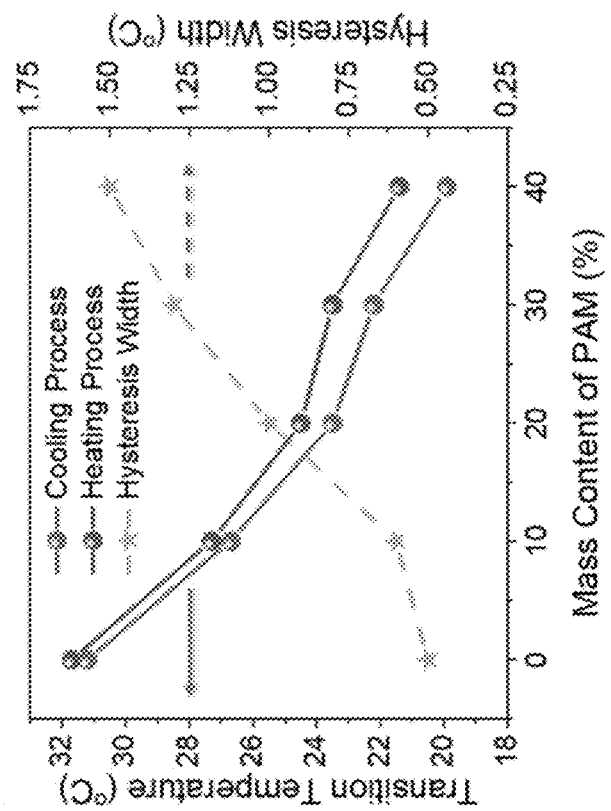
FIG. 6B shows transition temperature and hysteresis width of TTHW with the change of the mass content of PAM.
Figure 6A:
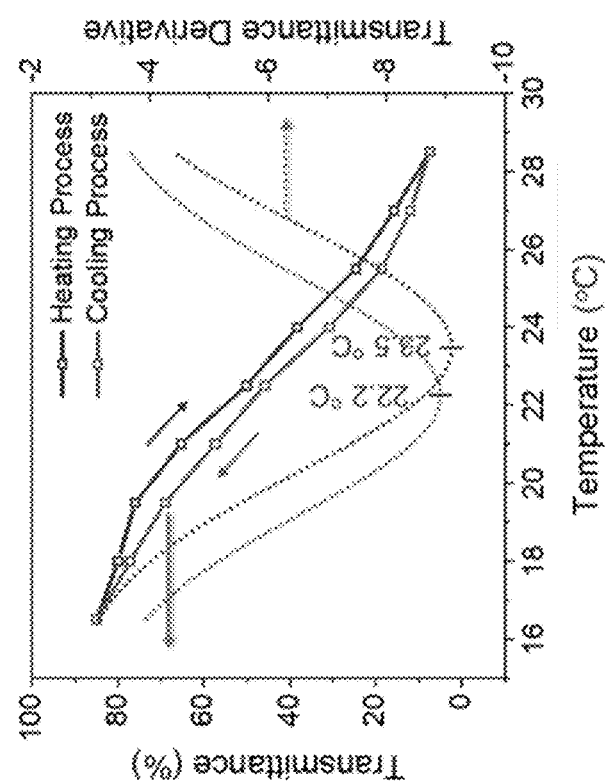
FIG. 6A shows the temperature-dependent transmittance of TTHW with 30 wt % PAM and its transition temperature (measured at wavelength of 550 nm) upon heating and cooling processes (solid line represents the transmittance, dash line represents the transmittance derivative value).

The thermo-responsive optical switching property of TTHW was characterized by measuring the temperature-dependent transmittance at the wavelength of 550 nm. $T_{c,h}$ (transition temperature of heating process) and $T_{c,c}$ (transition temperature of cooling process) are the temperature points showing the minimum values at the first derivative upon the heating and cooling curves, respectively (FIG. 6A). The difference in value of $T_{c,h}$ and $T_{c,c}$ ($\Delta T_c = T_{c,h} - T_{c,c}$) is defined as the hysteresis width. It is generally appreciated that a smaller $\Delta T_c$ implies a sensitive optical response, which is more desirable for thermochromic smart windows.

It is found that the content of PAM could significantly influence the $T_c$ of the TTHW. As shown in FIG. 6B, pure PNIPAM has a $T_{c,h}$ and $T_{c,c}$ at around 31.7° C. and 31.2° C. respectively, and with the increased mass concentration of PAM, the $T_{c,h}$ and $T_{c,c}$ can be significantly reduced, reaching as low as about 21.4° C. and about 19.9° C., respectively, for PAM of 40 wt %. This phenomenon can be explained by the formation of intermolecular interaction (i.e. hydrogen bonding) between PNIPAM and PAM that prevents PNIPAM being exposed to water, which leads to a hydrophobic contribution that decreases the $T_c$.

The $\Delta T_c$ decreases with the increased content of PAM, but the influence is not significant (FIG. 6B), and the hysteresis width is still narrow even when the PAM reaches 40 wt % (i.e. 1.5° C.). It should be noted that for thermochromic smart windows applied in buildings, the optical switch should take place for temperature values close to room temperature which is between about 20° C. and about 25° C. to maximize the energy saving in HVAC systems. Therefore, a mass content of 30% wt of PAM in TTHW (whose $T_c$ is about 22.9° C. (average value of $T_{c,h}$ and $T_{c,c}$), FIG. 6A) was selected for further studies.

Apart from transition temperature, the transition time (t) of thermochromism is also generally considered as one of the key parameters in determining the practical feasibility of a smart window material. Given that the window temperature fluctuates with the ambient environment, a faster switching characteristic (e.g. in several minutes) is preferred.

Figure 6D:
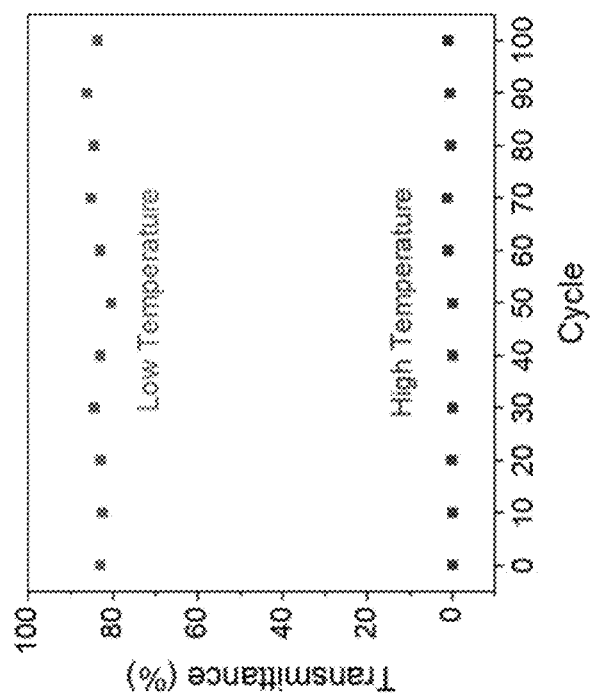
FIG. 6D shows reversible optical transmittance of TTHW during alternative heating and cooling treatments for 100 cycles.
Figure 6C:
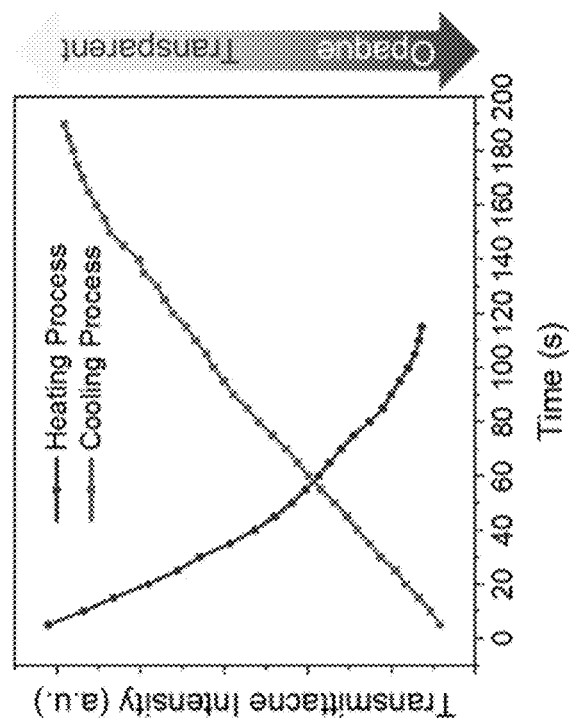
FIG. 6C shows transition time measurement of TTHW upon heating and cooling processes.

The transition time measurement results of TTHW are shown in FIG. 6C. In general, TTHW undergoes a rapid and sensitive optical response between the transparent state and opaque state with a short time. More specifically, it can complete the reversible optical transition at around 2 minutes and 3 minutes in the heating and cooling processes, respectively, which is desirable for energy-saving windows.

The heating process transition time ($t_{c,h}$) was found to be shorter than that of the cooling process ($t_{c,c}$). The reason may be that during the swelling process (i.e. cooling process), the shrunken microgel particles suffer a large resistance when water diffuses into the microgel particles. However, during the shrinking process (i.e. heating process), the microgel particles shrink from the swollen state through which the diffusion resistance of water is smaller. Therefore, the heating process has a relatively more rapid response compare with the cooling process.

Another key parameter that determines the practical feasibility of a smart window material is the number of transition cycle of the material. As shown in FIG. 6D, there is no significant fatigue in terms of the transmittance of TTHW at both the cold and hot states after 100 transition cycles, proving the excellent stability and durability of TTHW.

Example 3

Optical Properties of TTHW

It is appreciated that optical properties such as optical transmittance, optical haze, anti-glare ability, etc. are critical to solar and light management. To characterize the thermochromism of TTHW, the optical transmittance (i.e. specular transmission+diffuse transmission) of TTHW from about 300 nm to about 2500 nm was measured by a spectrophotometer at 20° C. (i.e. cold state) and 40° C. (i.e. hot state) and the results were compared with pure PNIPAM-PAM.

Figure 7:
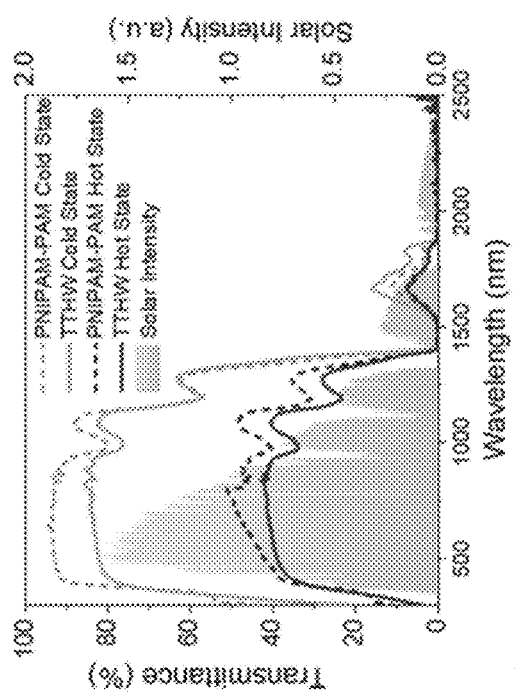
FIG. 7 shows transmittance spectra (i.e. specular transmission+diffuse transmission) of PNIPAM-PAM hydrogel and TTHW at the cold and hot states.

The spectra comparison as shown in FIG. 7 demonstrates that the high transmittance as well as the high optical contrast between the cold and hot states of PNIPAM-PAM is preserved in TTHW after impregnating the delignified wood with PNIPAM-PAM. The results show that the $T_{lum}$ of TTHW could reach as high as about 82.7% at the cold state. Notably, $T_{lum}$ sharply decreased to about 39.8% at the hot state, implying a strong temperature-dependent optical transition. $\Delta T_{sol}$ was determined to be about 38.1%. Such a high optical contrast, which can promptly modulate a large amount of solar radiation, is highly desired. It should be noted that the thermochromism of TTHW is attributed to the phase separation of PNIPAM microgel particles, leading to the efficient scattering from about 300 nm to about 1400 nm, accounting for about 89% of the solar energy in the solar spectrum.

Figure 8A:
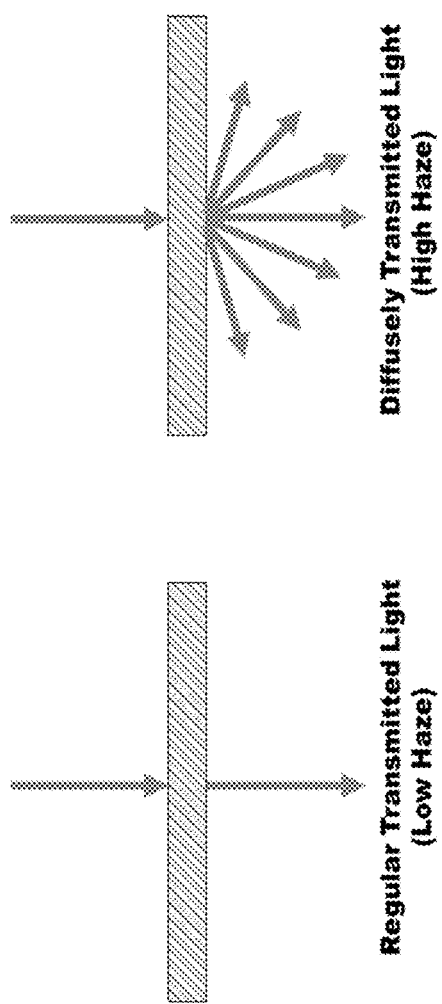
FIG. 8A shows a schematic diagram illustration of regular transmitted light and diffusely transmitted light.
Figure 8C:
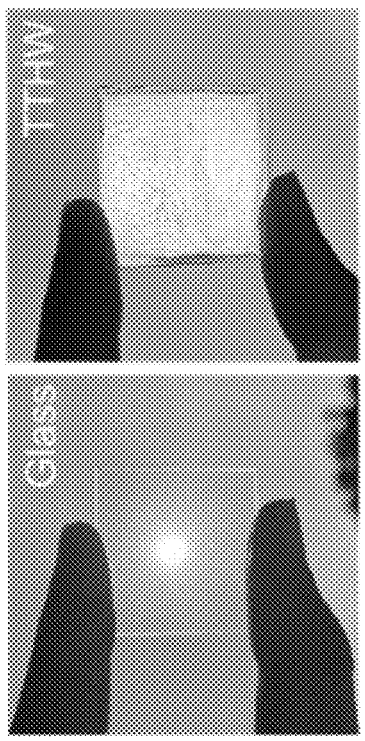
FIG. 8C shows anti-glare comparison between normal glass and TTHW (at the cold state) attached on glass under direct sunlight.
Figure 8B:
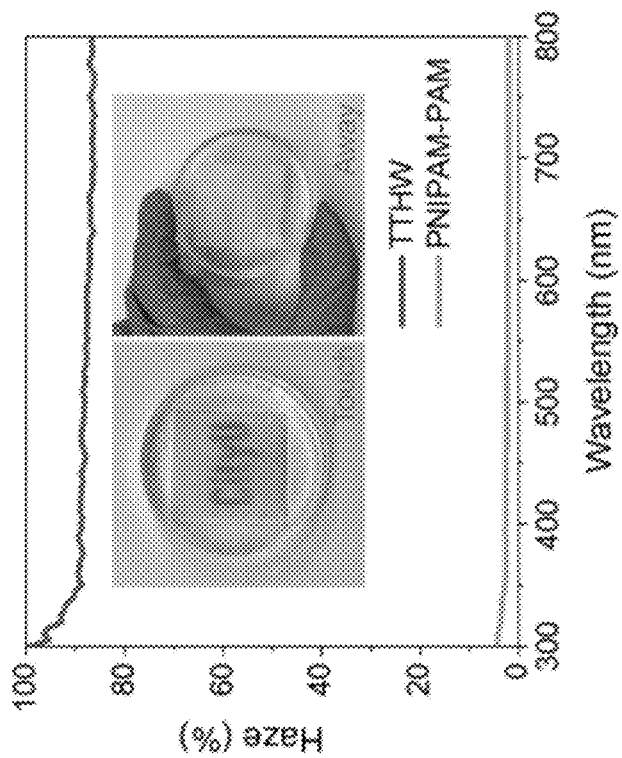
FIG. 8B shows optical transmittance haze spectra of TTHW and PNIPAM-PAM hydrogel at the cold state (the inserted figures show the haze effect of TTHW).

Optical haze, which is another important parameter for window applications, of the TTHW has been investigated and compared with pure PNIPAM-PAM hydrogel. In general, low haze can provide a clear view through the window, while high-haze window obscures the view but can protect indoor privacy and create a more uniform light environment due to the strong scattering (FIG. 8A). As shown in FIG. 8B, the haze of pure PNIPAM-PAM hydrogel is low, but after impregnating the delignified wood with the PNIPAM-PAM hydrogel, the TTHW possesses a high haze of nearly 90% in the visible light region. The high haze of TTHW can be intuitively observed from the inserted figure of FIG. 8B. When the TTHW is close to paper, the characters on the paper can be clearly seen. However, when the TTHW is 1 cm away from the paper, the characters are no longer be visible. This property may allow the TTHW to effectively protect the user's privacy.

The high haze of TTHW is mainly caused by the collective scattering throughout the transparent wood at the hydrogel-delignified wood interface. The high haze brings another advantage that the indoor illumination is consistent and uniform. Especially, TTHW can provide an anti-glare effect (FIG. 8C). In short, the excellent optical properties of TTHW are not only advantageous over other thermochromic materials on solar regulation, but can also provide additional functions including anti-glare and privacy protection.

Example 4

Mechanical Properties of TTHW

It is reported that, in practice, conventional hydrogels have to be sealed and fixed in double-glazed units due to their mechanical and physical weakness, making them difficult to maintain and replace. In sharp contrast, TTHW of the present invention was found to be physically stronger with better mechanical properties as compared with the conventional hydrogels, particularly the TTHW is able to keep its shape without external support (free-standing), allowing it to be attached to existing windows without replacing the whole units. To prove the strong mechanical properties, the TTHW was characterized in terms of flexibility and mechanical strength.

Figure 9:
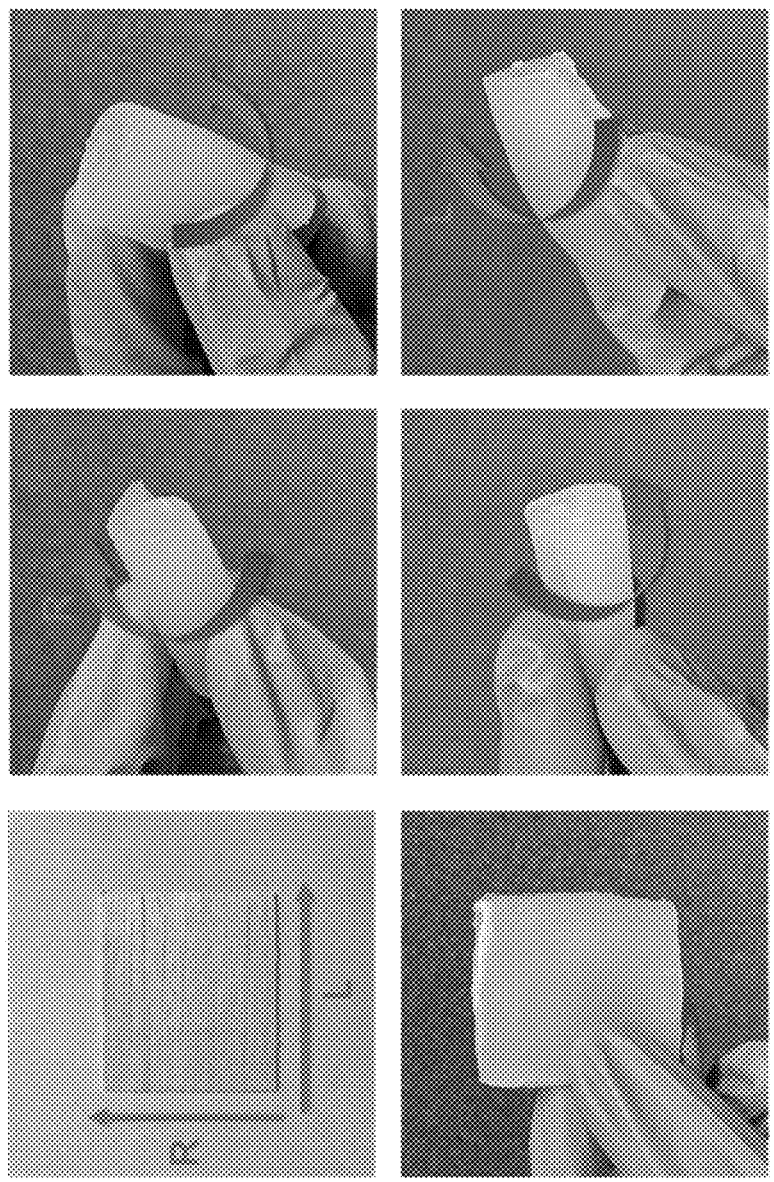
FIG. 9 shows the TTHW being bent and rolled in both the L and R directions and rapidly recovers its original shape without fracture.

As shown in FIG. 9, the TTHW can be easily rolled up in both the L and R directions. Moreover, it can completely recover its original shape without structural damage. Such an excellent flexibility performance may be explained by the delignified wood structure, the intrinsic properties of the hydrogel as well as the effective bonding between PNIPAM-PAM and the delignified wood structure.

It is reported that wood consists of a three-dimensional hierarchical skeleton of hollow fibers which are aligned with the tree growth direction, leading to the highly anisotropic structure in the L (along with the growth direction of wood) and R (normal to the growth direction of wood) directions (FIG. 9). After the delignification process, not only the tight connections between the aligned cellulose nanofibers are released and the inherent structure of the aligned cellulose nanofibers in the wood is preserved, but also achieving higher microfibril angles after the delignification, which enhance the extensibility of the wood fibers. Meanwhile, any external mechanical force applied to the TTHW can be readily dissipated by the flexible PAM hydrogel network. Accordingly, the TTHW exhibits high flexibility as a result of the intrinsic flexible property of PAM as well as the effective bonding between the PNIPAM-PAM and the highly extended wood fibers and/or cellulose nanofibers.

Figure 10B:
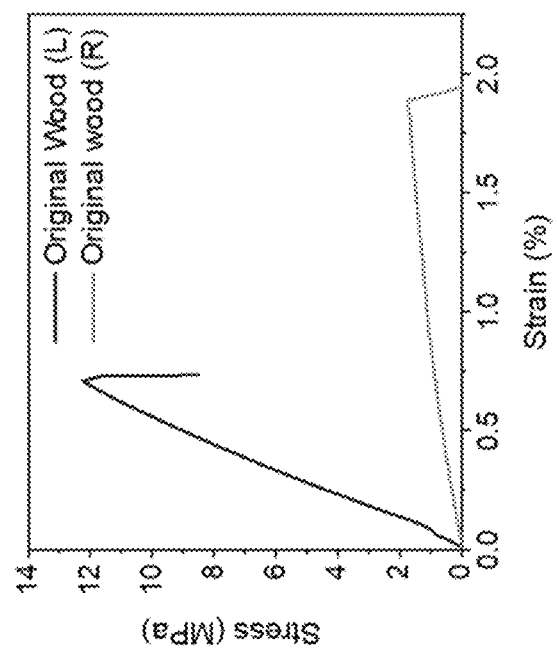
FIG. 10B shows tensile stress-strain curves of original balsa wood in L and R directions.
Figure 10A:
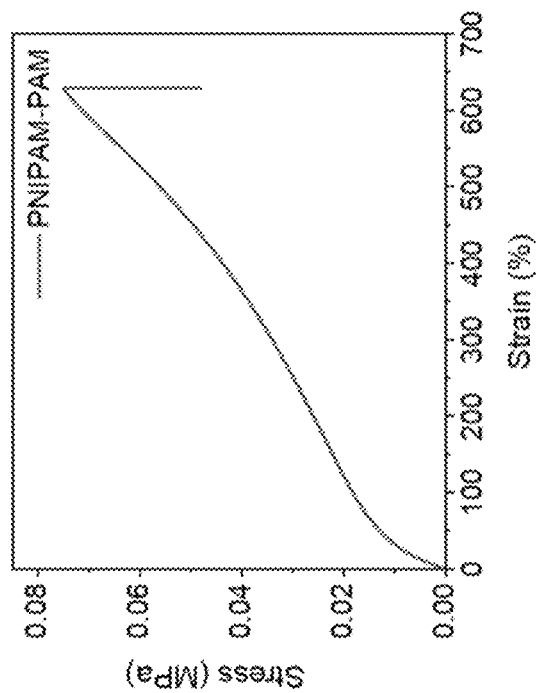
FIG. 10A shows tensile stress-strain curves of PNIPAM-PAM hydrogel.
Figure 10C:
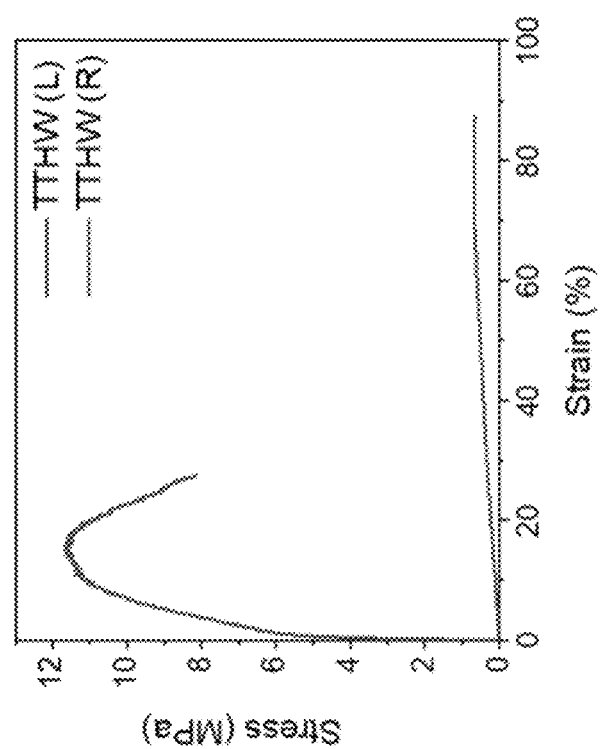
FIG. 10C shows tensile stress-strain curves of TWWH in L and R directions.

The tensile stress of the original balsa wood, PNIPAM-PAM hydrogel and TTHW were investigated and the corresponding results are shown in FIG. 10A to FIG. 10C and Table 1.

TABLE 1

Comparison of mechanical properties of the original balsa wood, PNIPAM-PAM hydrogel and TTHW

|  | Strain (%) | Stress (MPa) | Young's Modulus (MPa) |
|---|---|---|---|
| PNIPAM-PAM Hydrogel | 629 | 0.07 | 0.01 |
| Original Wood (L) | 0.70 | 12.25 | 1750 |
| Original Wood (R) | 1.90 | 1.70 | 89.47 |
| TTHW (L) | 14.20 | 11.60 | 81.69 |
| TTHW (R) | 87.40 | 0.65 | 0.74 |

Pure PNIAM-PAM hydrogel is an isotropic material, having a fracture strength of 0.07 MPa and modulus of 0.01 MPa. However, the strength and modulus of the TTHW are around 11.6 MPa (R direction) and 81.69 MPa (L direction), almost 165 times and 8169 times greater than that of the pure PNIPAM-PAM hydrogel in fracture strength and modulus, respectively, while TTHW also demonstrates a higher strength (0.65 MPa) and modulus (0.74 MPa) as compared with the PNIPAM-PAM hydrogel in the R direction.

On the other hand, compared with the original balsa wood whose strains are only 0.7% and 1.9% in the L and R directions, respectively, the strain of TTHW can achieve 14.2% in the L direction and 87.4% in the R direction, resulting in greater toughness. The results demonstrate that TTHW inherits the high strength of cellulose nanofibers to eliminate the mechanical weakness of the pure hydrogel, while the PNIPAM-PAM hydrogel enhances the connection between each fiber through forming the hydrogen bonding to overcome the brittleness of the original balsa wood. In summary, the strong TTHW is completely free-standing and possesses superior flexibility, making it easy to transport, and users can easily paste the TTHW on existing conventional windows to conveniently achieve a thermochromic smart window.

Example 5

Thermal Properties of TTHW

Figure 11:
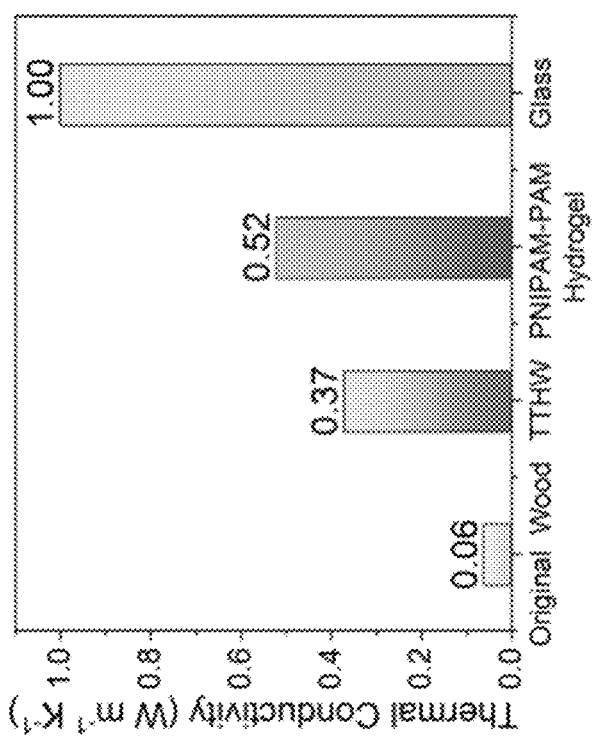
FIG. 11 shows thermal conductivity measurement of the glass, PNIPAM-PAM hydrogel, original wood and TTHW (perpendicular to the wood fibers).

The heat transfer between the indoor and outdoor environment is an important factor that influences the energy consumption in buildings. Therefore, windows with good thermal insulation capability can effectively prevent heat gain in summer and heat dissipation in winter. Regarding the thermal properties, TTHW exhibits a low thermal conductivity of 0.37 W m$^{-1}$ K$^{-1}$ (measured along the direction perpendicular to the wood growth direction). For comparison, the thermal conductivity of the original wood, PNIPAM-PAM hydrogel, conventional glass as well as TTHW was measured and the results are shown in FIG. 11. The thermal conductivity of the quartz glass is about 1 W m$^{-1}$ K$^{-1}$. However, due to the low thermal conductivity of the original wood (0.06 W m$^{-1}$ K$^{-1}$) (measured along the direction perpendicular to the wood growth direction) and PNIPAM-PAM (0.52 W m$^{-1}$ K$^{-1}$), the thermal conductivity of TTHW was found to be 63% lower than that of conventional glass, implying that the TTHW has a great potential to be applied as a thermal insulation component of energy-efficient smart windows. Other than building applications, in view of the good thermal insulation ability, flexibility and the thermochromic properties, TTHW may be applied as a safe thermal insulation material in other merchandise (e.g. a heat-insulation cup cover).

Example 6

Energy Saving Performance of TTHW

To quantitatively evaluate the energy-saving performance of TTHW in a real situation, a field test using model houses was conducted in Hong Kong during autumn. The weather information is shown in Table 2.

TABLE 2

Climatological information measured by the on-site weather station in Hong Kong

| Date | Mean Air Pressure (hPa) | Minimum Air Temperature (° C.) | Maximum Air Temperature (° C.) | Mean Cloud Cover | Relative Humidity | Wind Speed (m/s) |
|---|---|---|---|---|---|---|
| Oct. 22$^{nd}$, 2020 | 1011.8 | 21.6 | 30.8 | 69% | 63% | 0-3.6 |

Figure 12:
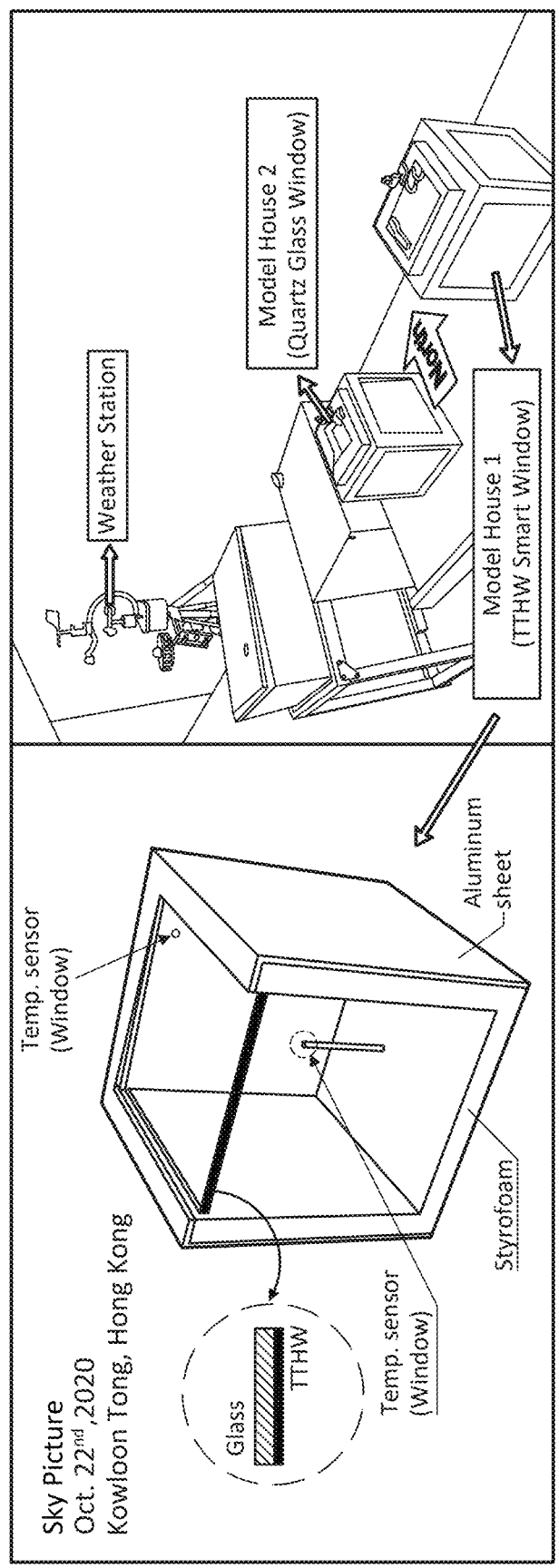
FIG. 12 shows a schematic diagram illustration of the model house field test setup.

TTHW was made of non-toxic, harmless wood and hydrogel, so in the real application, it can be directly pasted on the inner face of an existing window, which greatly increases the convenience and eliminates the risk involved for coating the window's exterior surface (e.g. falls from height). As shown in FIG. 12, a TTHW of 9 cm×9 cm was pasted to the inner face of a glass window to form a thermochromic smart window that was installed in a heat-insulated acrylic model house (Model House 1) with a volume of 20×20×20 cm$^3$. Another model house with a quartz glass window (Model House 2) was set as a reference for comparison.

These two model houses were placed on the roof of a building, and the windows of the two model houses were facing to the sky to mimic a roof window. The indoor air temperatures and window temperatures of these two model houses were monitored by T-type thermocouples (±0.01° C.). The ambient air temperature and global solar irradiation were measured by a weather station (Wu Han Chen Yun, YG-BX). The experiment started from 00:00 and ended at 18:00 on 22 Oct. 2020.

Figure 13:
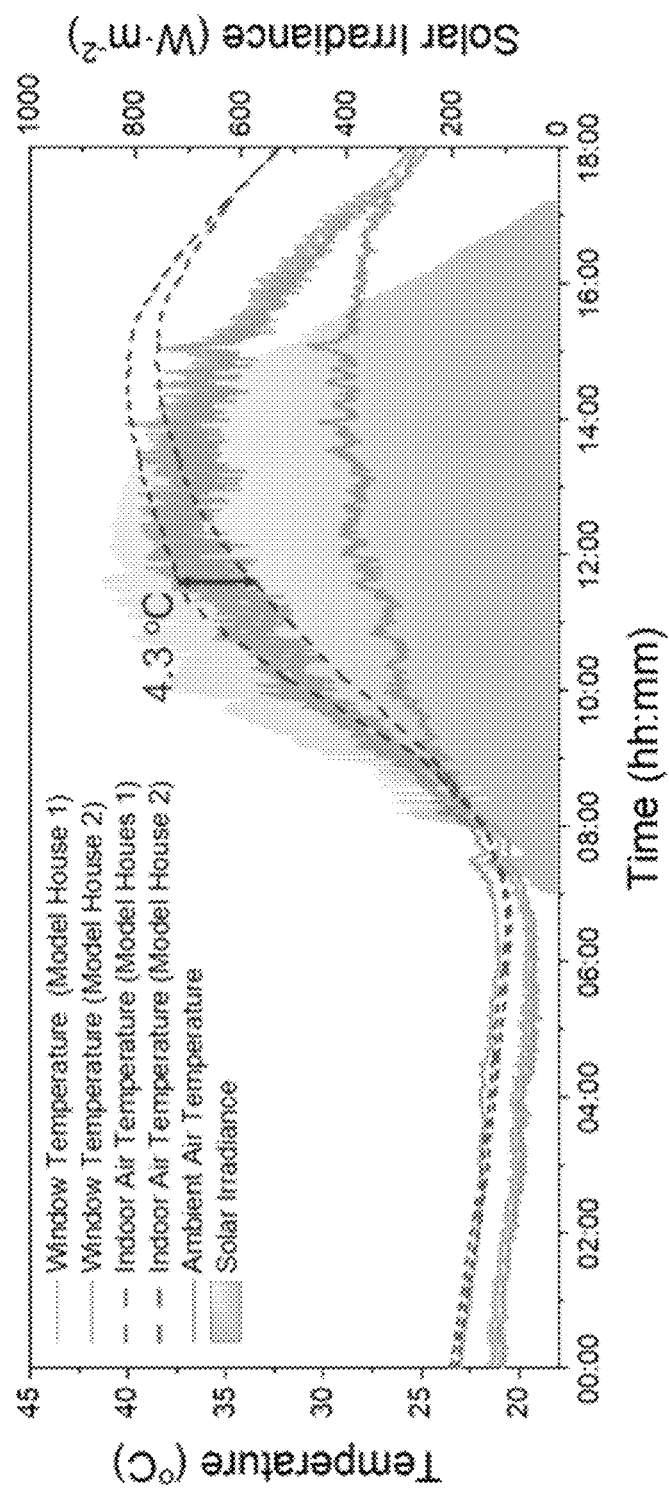
FIG. 13 shows temperature profiles of the model house field test on the 22 Oct. 2020 in Hong Kong.

As shown in FIG. 13, while the indoor air temperature of both the two model houses increases drastically as the solar intensity increases, the indoor air temperature of Model House 1 was found to be always lower than that of Model House 2 during the daytime, and the largest difference in indoor air temperature was determined to be 4.3° C. at around 11:30 AM when the solar irradiation intensity reached the highest point, which proved the effective sunlight shielding induced by the TTHW.

It should be noted that for Model House 1, the window temperature was higher than the indoor air temperature, implying that most of the solar heat was trapped by the window. In other words, the TTHW can prevent heating of the indoor environment by blocking the solar radiation. However, for Model House 2, as most of the solar radiation could pass through the transparent window, a higher indoor air temperature was recorded than the window temperature. Furthermore, with the decrease of solar intensity in late afternoon, the indoor air temperature difference between the two model houses gradually reduced since the TTHW smart window mainly mitigates the energy loss/gain through modulating the solar radiation.

Figure 14B:
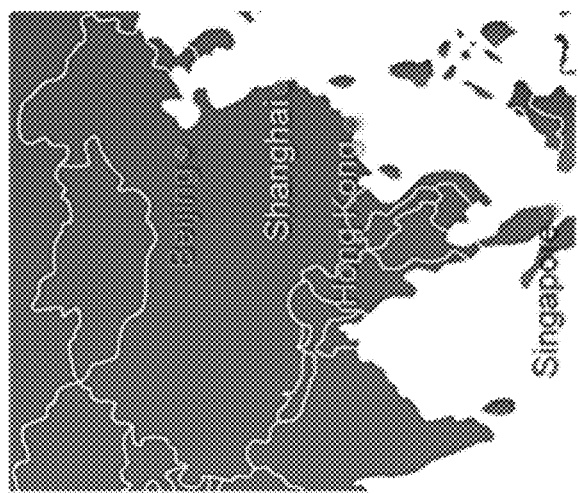
FIG. 14B shows the geographic location of Beijing, Shanghai, Hong Kong and Singapore.
Figure 14A:
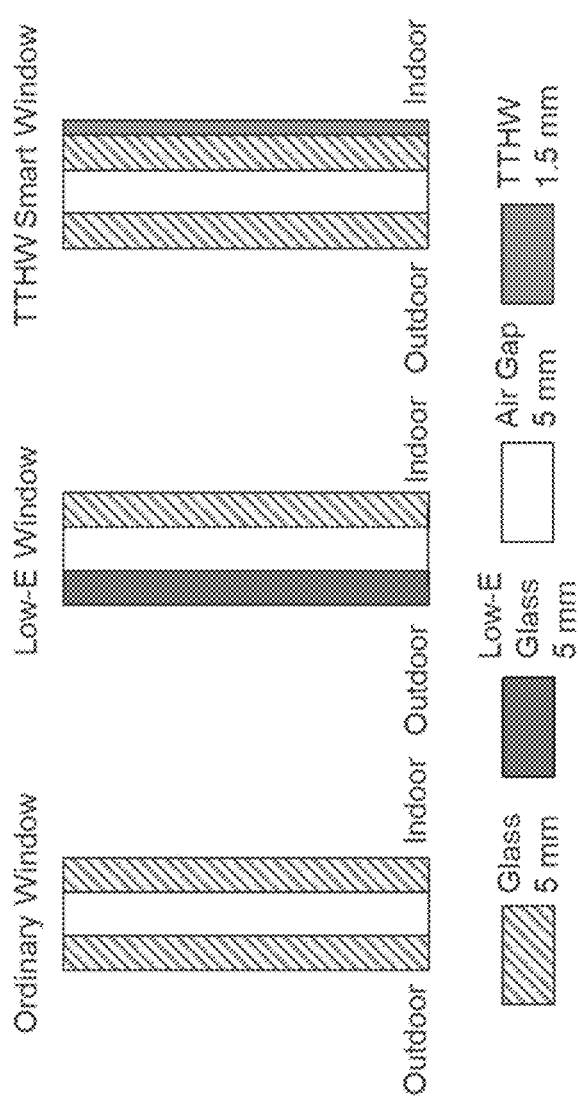
FIG. 14A shows a schematic diagram illustration of an ordinary window, a low-E window and a TTHW smart window.

The energy saving potential of TTWH and conventional windows in different cities has been evaluated and compared by a computational simulation using EnergyPlus. Specifically, a conventional double-glazing system (ordinary window) was created via the WINDOW algorithm developed by the Lawrence Berkeley National Laboratory (LBNL). TTHW was attached on the double-glazing system and named as TTHW smart window, and a low-E window was also established for the comparison (FIG. 14A). The optical properties of the ordinary window, low-E window and the TTHW smart window calculated by the WINDOW software are summarized in Table 3.

TABLE 3

Optical properties calculated by WINDOW 7.7 for EnergyPlus Simulation

| | Ordinary Window | TTHW Smart Window | | Low-E Window |
|---|---|---|---|---|
| Transition Temperature | — | 23° C. | | — |
| States | — | Transparent | Opaque | — |
| Solar Transmittance | 60.6% | 46.5% | 23.0% | 46.7% |
| Solar Front Reflectance | 11.4% | 14.2% | 28.9% | 21.4% |
| Solar Back Reflectance | 11.4% | 17.3% | 49.5% | 20.9% |
| Visible Transmittance | 78.1% | 65.2% | 32.5% | 75.1% |
| Visible Front Reflectance | 14.2% | 19.2% | 36.5% | 10.3% |
| Visible Back Reflectance | 14.2% | 17.8% | 37.0% | 10.7% |
| Emissivity | 0.84 | 0.84 | 0.84 | 0.06 |

A 12-floor large office reference building (Building information is described in Table 4) established by the U.S. Department of Energy (DOE) was used in the simulation to evaluate the energy consumption by using the ordinary window and TTHW smart window.

TABLE 4

Building information of the reference building

| | |
|---|---|
| Building type | 12-floor office building |
| Length × Width | 73.2 m × 48.8 m |
| Window Fraction (Window-to-Wall Ratio) | 40% |
| Thermostat setpoint for HVAC system | 21.1° C. cooling/23.9° C. heating |
| Setpoint for lighting control | 500 lux |

Four cities from north to south in terms of latitudinal positions in Asia, namely Beijing, Shanghai, Hong Kong, and Singapore (FIG. 14B), were selected in the EnergyPlus simulation. The geographical and climate information of these four cities is shown in Table 5.

TABLE 5

Geographical and climate information

| Cities | Geographic Coordinate | Climate Types | Average Temperature | Average Humidity |
|---|---|---|---|---|
| Beijing | N 39°54'26" E 116°23'50" | Continental: with cold but sunny winters, and hot, humid, and rainy summers. | −4.3° C.-25.9° C. | 46%-74% |
| Shanghai | N 31°13'19" E 121°27'29" | Temperate: with relatively cold winters, and hot, humid and rainy summers. | 3.7° C.--27.8° C. | 77%-84% |
| Hong Kong | N 22°17'07" E 114°09'27" | Subtropical: with very mild winters and hot, rainy, and humid summers. | 16.3° C.-28.8° C. | 69%-83% |
| Singapore | N 1°17'22" E 103°51'00" | Equatorial: hot, humid, and rainy throughout the year. | 26.4° C.-28.3° C. | 82%-87% |

Figure 14C:
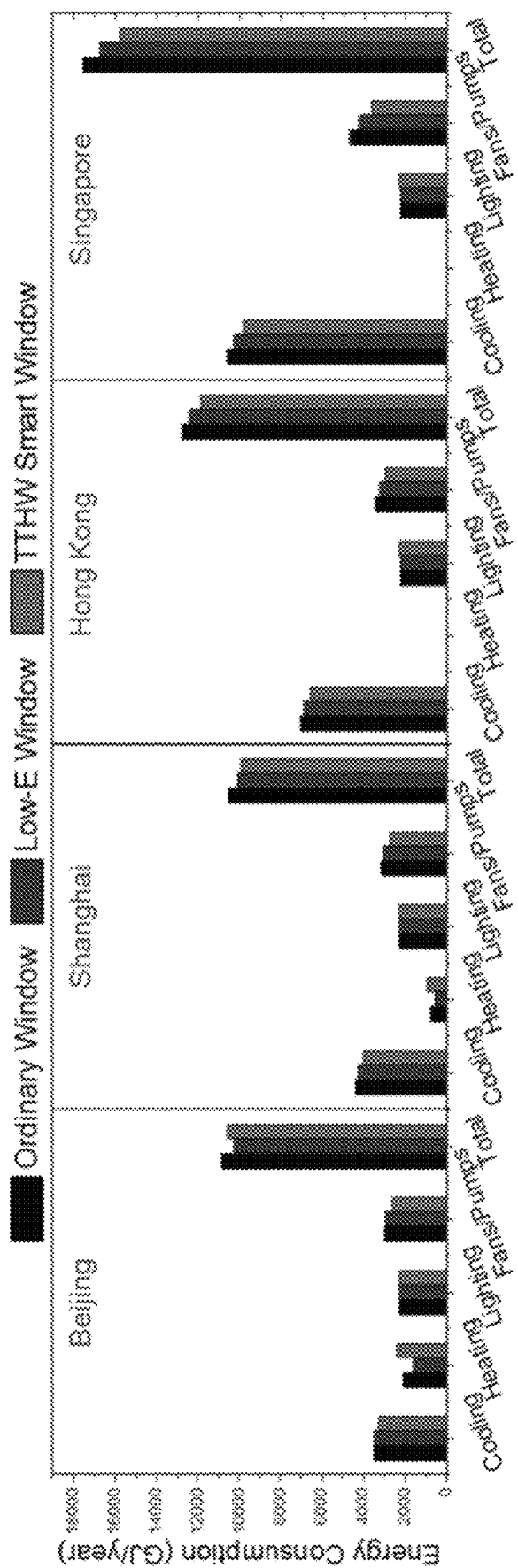
FIG. 14C shows simulated energy consumption per year of a building using the ordinary window, low-E window and the TTHW smart window in Beijing, Shanghai, Hong Kong and Singapore.
Figures 14D, 14E:
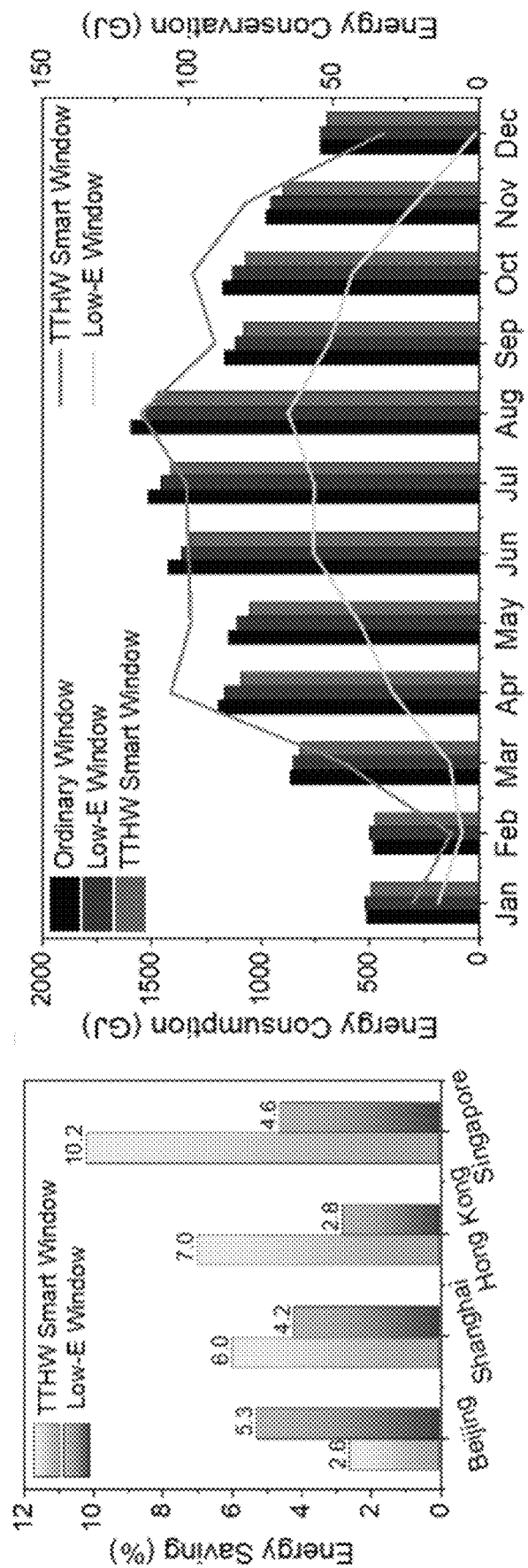
FIG. 14D shows energy saving potential of the TTHW smart window and low-E window compared with the ordinary window.
FIG. 14E shows the energy consumption and energy conservation comparison in a building by using the ordinary window, low-E window and TTHW smart window in Hong Kong. The histogram represents the monthly energy consumption. The line charts represent the energy conservation by the low-E window and TTHW smart window compared with the ordinary window.

Influences from surrounding buildings were ignored, and the time step interval was set as 10 minutes in the simulation. The total energy saving potential of the TTHW smart window and low-E window over the ordinary window for the selected four cities (i.e. Beijing, Shanghai, Hong Kong and Singapore) in Asia are shown in FIG. 14C. The results demonstrate that the TTHW smart window can achieve significant energy saving in all these four cities compared with those using the ordinary window. Specifically, about 2.6% energy can be saved in Beijing during the whole year, while over about 10% energy can be saved in Singapore (FIG. 14D). Besides, as shown in FIG. 14C, it can be observed that the energy consumption of cooling and its subsidiary equipment (i.e. fans and pumps) is reduced significantly in all cities by using the TTHW, which is the key contribution to the total energy saved.

In addition, in Shanghai, Hong Kong and Singapore, the energy saving performance by using TTHW in a building is much better than that using the low-E window. It should be noted that only in Beijing, the low-E window demonstrates the best energy saving potential. This may be account for by the detrimental effect of the thermochromic smart window on solar heat gain as a result of its relatively low solar transmittance, implying that the thermochromic smart window can block the sunlight in cold winter, resulting in an increase of the heating load in buildings (FIG. 14C, Beijing). Conversely, the emissivity of the low-E window is low, implying that most of the internal thermal radiation will be reflected back to the indoor environment, reducing the radiant heat loss through the glass. Since Beijing is a city that consumes a huge amount of heating energy in winter, and this may explain why the energy-saving potential of the TTHW is not as high as the low-E window for Beijing.

Regarding the consumption of lighting energy, even though the indoor illuminance decreases when using the TTHW smart window, the lighting energy consumption does not increase too much compared with the ordinary window (FIG. 14C) because in most large office buildings, artificial lighting is needed during the day to maintain the illuminance requirement, especially in the internal zone. Therefore, the influence of TTHW on lighting energy consumption is less significant.

To further illustrate the energy saving performance of the TTHW smart window over a year, monthly energy consumption of a building in Hong Kong was measured and the results are shown in FIG. 14E. As shown, less energy is consumed over the whole year when the TTHW smart window was used as compared with the case when an ordinary window or low-E window was used. The TTHW smart window displays peak energy conservation during the summer, which demonstrates that it can significantly reduce cooling energy consumption in summer in Hong Kong.

Based on the above, the field test and EnergyPlus simulation have successfully proved that the TTHW smart window can effectively modulate the solar radiation, showing the considerable potential of TTHW as an energy-efficient material for windows in building applications.

Example 7

Comparison of Optical and Transition Properties of TTHW with Counterparts

A comprehensive comparison of different glazing techniques, including thermochromic smart windows and energy-efficient transparent woods in relation to the TTHW of the present invention, has been summarized and presented in FIG. 15 of the later part of disclosure.

For various thermochromic smart windows, several most commonly reported thermochromic materials have been included in the comparison. It can be seen from FIG. 15 that when compared with ionic liquid thermochromic smart window, the TTHW smart window demonstrates a high transparency at the cold state, and its transition temperature (~23.5° C.) is much lower than that of ionic liquid thermochromic smart windows (~80° C.). The low transition temperature of the TTHW enables the thermochromism to be easily triggered in the natural environment making it more suitable in real applications than the ionic liquid smart windows.

In comparison with the perovskite thermochromic smart window, the TTHW smart window has a relatively higher $\Delta T_{sol}$, implying that a higher energy-saving potential can be achieved. Most importantly, the TTHW smart window is made of non-toxic wood and hydrogel, which is greener than the perovskite thermochromic smart windows since $Pb^{2+}$ in the perovskite thermochromic smart window is a toxic element.

In comparison with $VO_2$ thermochromic smart windows, the TTHW smart window demonstrates a higher $\Delta T_{sol}$ since the thermochromism of $VO_2$ only occurs in the near-infrared region (about 800 nm to about 2500 nm). Besides, at the cold state, the $VO_2$ thermochromic smart windows are brownish in color which is aesthetically detrimental for window applications in buildings.

For energy-efficient transparent woods, examples such as those with the delignified wood impregnated with a heat-shielding nanoparticles (e.g. $Cs_xWO_3$, ATO and $VO_2$)-containing polymer are included for comparison (FIG. 15). Although it is reported that these materials can be applied to replace windows in buildings, it should be noted that most of the heat-shielding nanoparticles absorb parts of visible light, which means that the luminous transmittance of those functional transparent woods is lower than that of the TTHW smart window. Most importantly, it is the first time, and only as demonstrated by the inventors that functional transparent wood particularly the TTHW of the present invention can exhibit a smart thermochromism which has never been achieved by any reported functional transparent wood.

Moreover, the application of the TTHW by directly attaching on the inner face of an existing window rather than replacing the whole window like other transparent woods, eliminates the concern about the poor weather resistance of transparent wood in severe weather conditions. Overall, the TTHW smart window provides outstanding thermochromic properties, giving it great potential for real applications.

REMARKS AND REFERENCES FOR FIG. 15

[1]: Optical properties include luminous transmittance at the hot ($T_{lum,hot}$) and cold states ($T_{lum,cold}$), and their average value ($T_{lum,ave}$), and solar modulation ability ($\Delta T_{sol}$).

[2]: Transition properties include transition temperature at the hot ($T_{c,h}$) and cold states ($T_{c,c}$), their average value ($T_c$) and hysteresis width ($\Delta T_c$, i.e. the transition temperature difference between the hot state and cold state) and transition time at the cold ($t_{c,c}$) and hot states ($t_{c,h}$).

[3]: The solar modulation ability ($\Delta T_{sol}$) to characterize the thermochromism of the $VO_2$-TW was not reported in Ref. [7].

REFS

[1] Zhu J, Huang A, Ma H, Ma Y, Tong K, Ji S, et al. Composite Film of Vanadium Dioxide Nanoparticles and Ionic Liquid-Nickel-Chlorine Complexes with Excellent Visible Thermochromic Performance. ACS Appl Mater Interfaces 2016; 8:29742-8. https://doi.org/10.1021/acsami. 6b 11202.

[2] Liu S, Du Y W, Tso C Y, Lee H H, Cheng R, Feng S P, et al. Organic Hybrid Perovskite (MAPbI3-xClx) for Thermochromic Smart Window with Strong Optical Regulation Ability, Low Transition Temperature, and Narrow Hysteresis Width. Adv Funct Mater 2021; 2010426: 1-12. https://doi.org/10.1002/adfm.202010426.

[3] Zhou Y, Cai Y, Hu X, Long Y. Temperature-responsive hydrogel with ultra-large solar modulation and high luminous transmission for "smart window" applications. J Mater Chem A 2014; 2:13550-5. https://doi.org/10.1039/c4ta02287d.

[4] Kong M, Egbo K, Liu C P, Hossain M K, Tso C Y, Hang Chao C Y, et al. Rapid thermal annealing assisted facile solution method for tungsten-doped vanadium dioxide thin films on glass substrate. J Alloys Compd 2020; 833:155053. https://doi.org/10.1016/j.jallcom.2020.155053.

[5] Yu Z, Yao Y, Yao J, Zhang L, Chen Z, Gao Y, et al. Transparent wood containing CsXWO3 nanoparticles for heat-shielding window applications. J Mater Chem A 2017; 5:6019-24. https://doi.org/10.1039/c7ta00261k.

[6] Qiu Z, Xiao Z, Gao L, Li J, Wang H, Wang Y, et al. Transparent wood bearing a shielding effect to infrared heat and ultraviolet via incorporation of modified antimony-doped tin oxide nanoparticles. Compos Sci Technol 2019; 172:43-8. https://doi.org/10.1016/j.compscitech.2019.01.005.

[7] Zhang L, Wang A, Zhu T, Chen Z, Wu Y, Gao Y. Transparent Wood Composites Fabricated by Impregnation of Epoxy Resin and W-Doped VO2Nanoparticles for Application in Energy-Saving Windows. ACS Appl Mater Interfaces 2020; 12:34777-83. https://doi.org/10.1021/acsami.0c06494.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A composite material for use in a window unit comprising:
    a substrate body having a mesoporous structure of delignified wood defined by a network of interconnected fibers; and
    a thermochromic material comprising a hydrogel complex filling and being supported by the mesoporous structure, the hydrogel complex comprising a refractive index-matching polymer including poly(acrylamide) (PAM), the refractive index-matching polymer forming a first crosslinked network holding a plurality of microgel particles of a thermoresponsive hydrogel including poly(N-isopropylacrylamide) (PNIPAM);
    wherein the plurality of microgel particles of the thermoresponsive hydrogel undergo a phase transition in direct response to an external temperature exceeding or falling below a critical transition temperature of the thermochromic material, thereby changing an overall transparency of the composite material; and
    wherein the critical transition temperature ($T_c$) of the thermochromic material is from about 20° C. to about 25° C.

2. The composite material according to claim 1, wherein the interconnected fibers are aligned in a longitudinal direction of the substrate body.

3. The composite material according to claim 1, wherein the interconnected fibers comprise hydroxyl groups, forming a hydrogen bond between each of the fibers.

4. The composite material according to claim 1, wherein the plurality of interconnected fibers comprises cellulose.

5. The composite material according to claim 1, wherein the delignified wood is selected from the group consisting of delignified balsa wood, delignified bass wood, delignified birch wood, delignified pine, and a combination thereof.

6. The composite material according to claim 1, wherein the plurality of microgel particles have a diameter from about 200 nm to about 700 nm.

7. The composite material according to claim 1, wherein the refractive index-matching polymer further forms a second crosslinked network with the plurality of interconnected fibers.

8. The composite material according to claim 1, wherein the hydrogel complex comprises about 30% wt to about 40% wt of the refractive index-matching polymer with respect to the composite material.

9. The composite material according to claim 1, wherein the refractive index-matching polymer is selected from the group consisting of epoxy, polyvinylpyrrolidone (PVP), poly(methyl methacrylate) (PMMA), poly(vinyl alcohol) (PVA), polydimethylsiloxane (PDMS), poly(acrylic acid), poly(acrylamide) (PAM), poly(aniline), poly(ethylene oxide), poly(N-acryloxysuccinimide), poly(N-isopropylacrylamide), poly(N-isopropylmethacrylamide), poly(N-vinylcaprolactam), poly(N-vinylpyrrolidone), poly(methacrylic acid), poly(styrene sulfonic acid), polyurethane, and poly(propylene oxide) (PPO), and a combination thereof.

10. The composite material according to claim 1, wherein the thermoresponsive hydrogel is selected from the group consisting of poly(N-isopropylacrylamide) (PNIPAM), hydroxypropyl cellulose (HPC), polyampholyte hydrogel (PAH), N-vinylcaprolactam (PNVCL), ethylene glycol-modified pillar[5]arene (EGP5), and a combination thereof.

11. A window unit comprising the composite material according to claim 1.

12. A method of preparing the composite material of claim 1 comprising the steps of:
   a) providing a precursor solution of the thermochromic material;
   b) immersing the substrate body into the precursor solution under a reduced pressure; and
   c) curing the precursor solution at room temperature such that the hydrogel complex fills and is supported by the mesoporous structure of the substrate, and the refractive index-matching polymer forms a first crosslinked network holding a plurality of microgel particles of the thermoresponsive hydrogel.

13. The method according to claim 12, wherein the substrate body is provided by a method comprising the steps of:
   i) immersing a portion of wood into a delignification solution to form a delignified wood substrate; and
   ii) isolating the delignified wood substrate.

14. The method according to claim 13, wherein the delignification solution comprises the group consisting of sodium hypochlorite, sodium chlorite, sodium hydroxide, sodium sulfite, and a combination thereof.

15. The method according to claim 12, wherein step a) comprises the steps of:
   i) preparing a thermoresponsive hydrogel solution comprising microgel particles thereof, and
   ii) forming a homogeneous solution comprising a precursor of the refractive index-matching polymer and the thermoresponsive hydrogel solution.

16. The method according to claim 15, wherein step ai) comprises the step of mixing a first thermoresponsive hydrogel monomer solution containing a surfactant with a second thermoresponsive hydrogel monomer solution containing a crosslinking agent.

* * * * *